(12) United States Patent
Taki et al.

(10) Patent No.: US 9,003,066 B2
(45) Date of Patent: Apr. 7, 2015

(54) STORAGE CONTROLLER SELECTING SYSTEM, STORAGE CONTROLLER SELECTING METHOD, AND RECORDING MEDIUM

(71) Applicant: Fujitsu Limited, Kawasaki-shi, Kanagawa (JP)

(72) Inventors: Satoshi Taki, Nagoya (JP); Akimasa Yoshida, Nagoya (JP); Kenichi Fujita, Nagoya (JP); Chiaki Nagashima, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/108,017

(22) Filed: Dec. 16, 2013

(65) Prior Publication Data
US 2014/0189277 A1 Jul. 3, 2014

(30) Foreign Application Priority Data
Dec. 27, 2012 (JP) ................... 2012-286291

(51) Int. Cl.
*G06F 13/14* (2006.01)
*G06F 13/16* (2006.01)
*G06F 3/06* (2006.01)

(52) U.S. Cl.
CPC .............. *G06F 13/161* (2013.01); *G06F 3/061* (2013.01); *G06F 3/0631* (2013.01); *G06F 3/0635* (2013.01); *G06F 3/067* (2013.01)

(58) Field of Classification Search
CPC ..... G06F 13/161; G06F 3/0631; G06F 3/067; G06F 3/0635; G06F 3/061
See application file for complete search history.

(56) References Cited

U.S. PATENT DOCUMENTS

| 6,986,139 B1 * | 1/2006 | Kubo ............................ 718/105 |
| 2014/0052908 A1 * | 2/2014 | Govande et al. .............. 711/112 |

FOREIGN PATENT DOCUMENTS

| JP | 2003-36210 | 2/2003 |
| JP | 2006-113868 | 4/2006 |

* cited by examiner

*Primary Examiner* — Farley Abad
(74) *Attorney, Agent, or Firm* — Staas & Halsey LLP

(57) ABSTRACT

A storage controller selecting system includes a time information storage unit, a receiver, and a processor. The time information storage unit is configured to store internal processing time information for each of a plurality of storage controllers. The internal processing time information for each individual storage controller relates to an internal processing time taken for processing performed within the individual storage controller in response to an access request to a logical volume. The receiver is configured to receive a creation request for requesting creation of a new logical volume. The processor is configured to select a certain storage controller from among the plurality of storage controllers according to the internal processing time information, and to cause the certain storage controller to create the new logical volume.

15 Claims, 19 Drawing Sheets

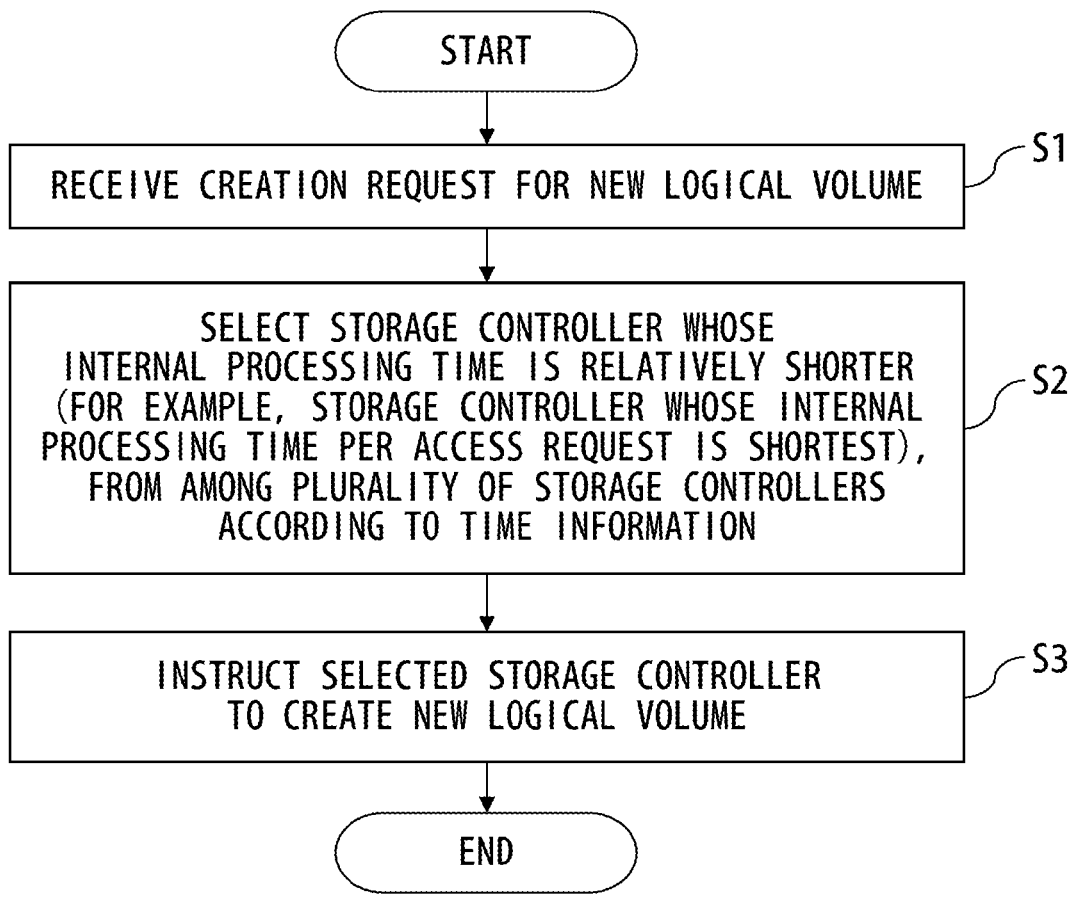
F I G. 1

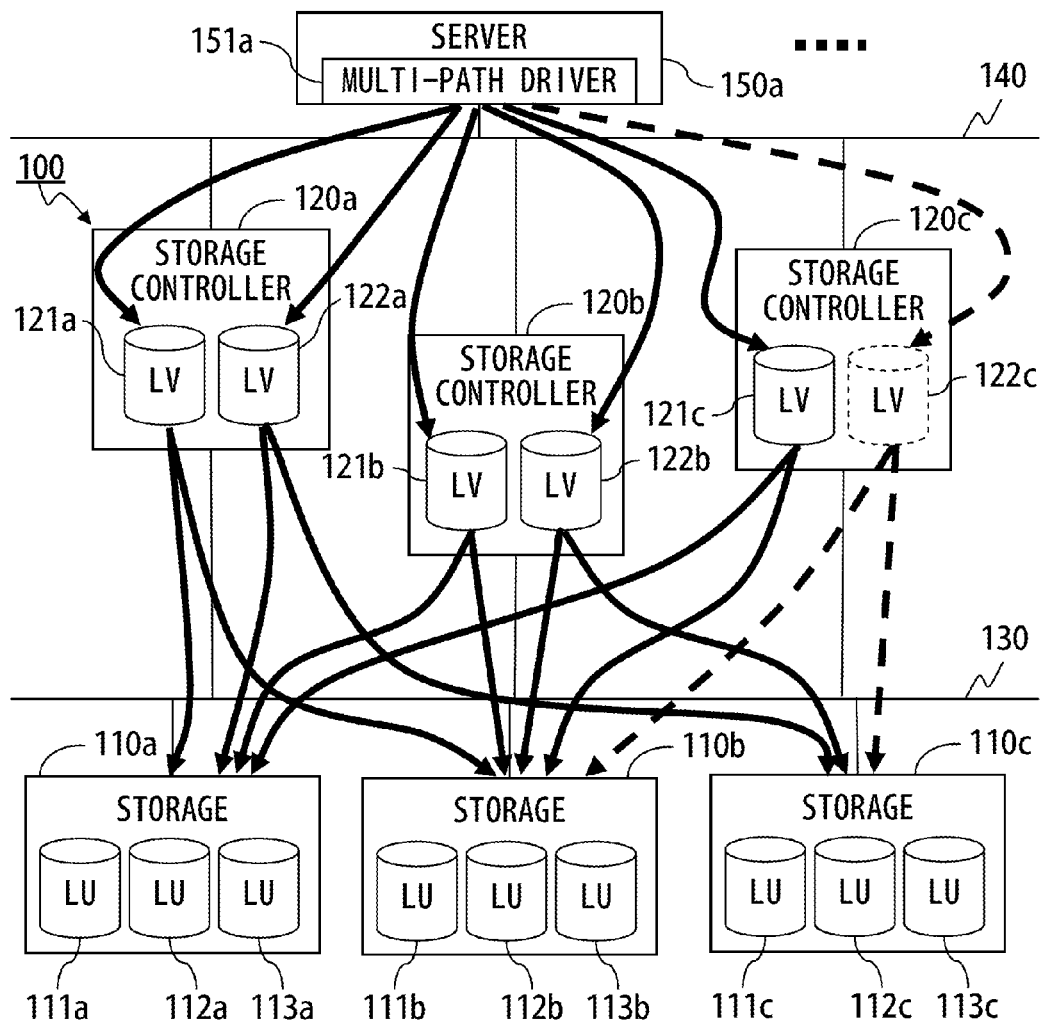
F I G. 2

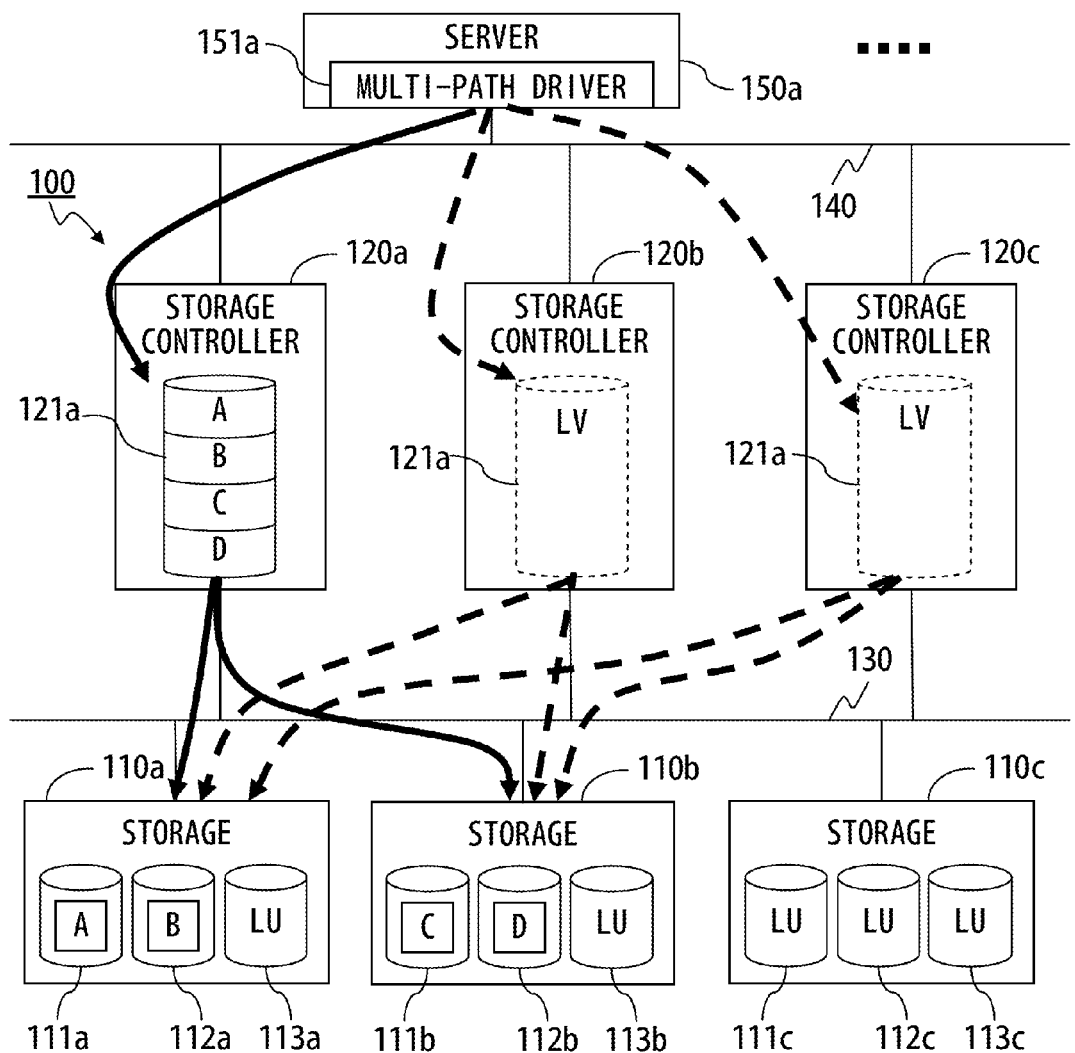
F I G. 3

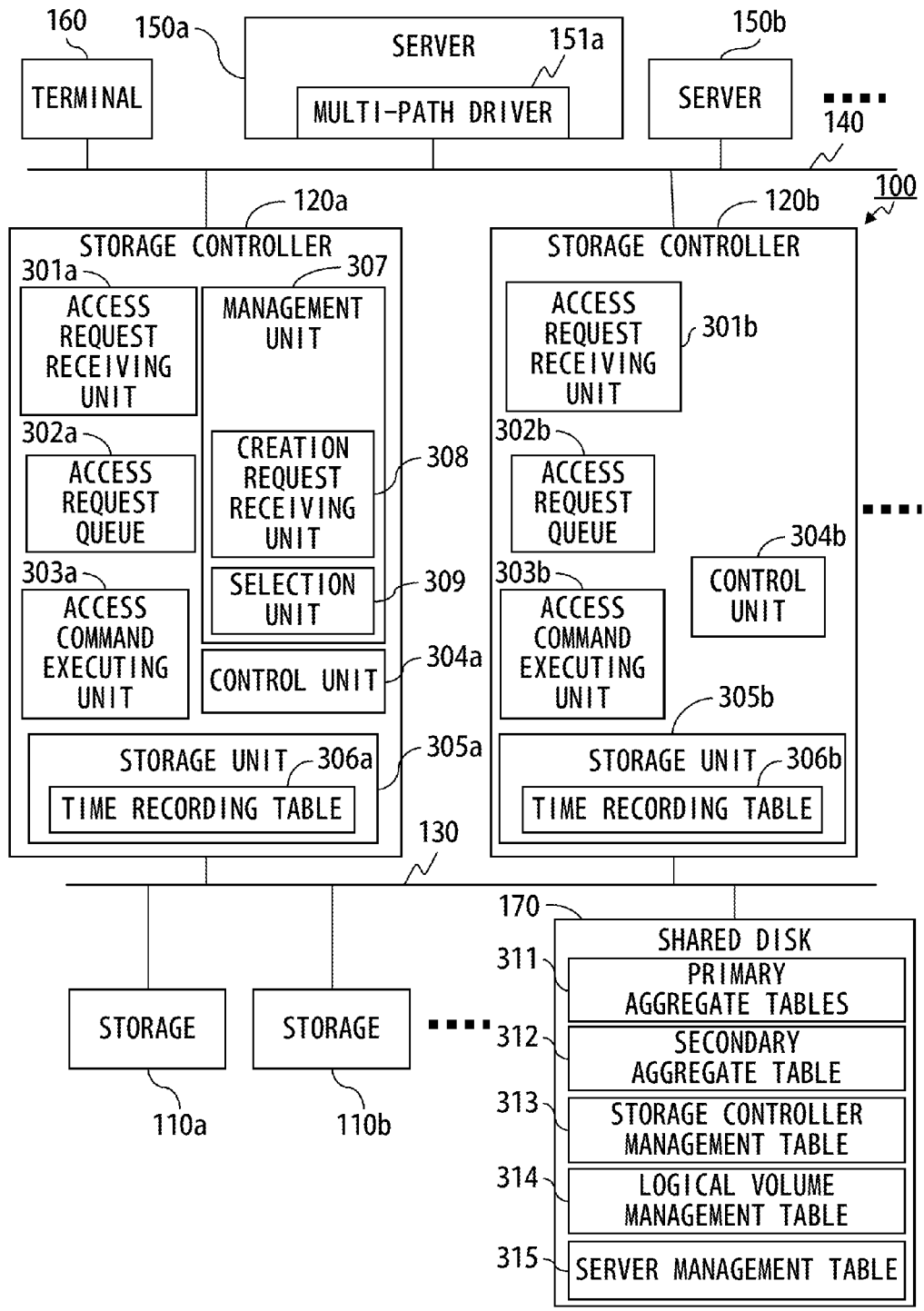
F I G. 5

306a

| ACCESS REQUEST NUMBER | INTERNAL PROCESSING TIME [MICROSECONDS] |
|---|---|
| 1 | 5217 |
| 2 | 6511 |
| 3 | 3321 |
| ... | ... |

311

| DATE | TIME | AVERAGE INTERNAL PROCESSING TIME [MICROSECONDS] | NUMBER OF EXECUTED ACCESS REQUESTS |
|---|---|---|---|
| 2011/2/3 | 10:00 | 3412 | 56 |
| 2011/2/3 | 10:01 | 6176 | 123 |
| 2011/2/3 | 10:02 | 2194 | 12 |
| 2011/2/3 | 10:03 | 10343 | 264 |
| ... | ... | ... | ... |

311a, 311b

312

| STORAGE CONTROLLER NUMBER | AVERAGE INTERNAL PROCESSING TIME [MICROSECONDS] |
|---|---|
| 1 | 8176 |
| 2 | 4528 |
| 3 | 12742 |
| ... | ... |

F I G. 1 0

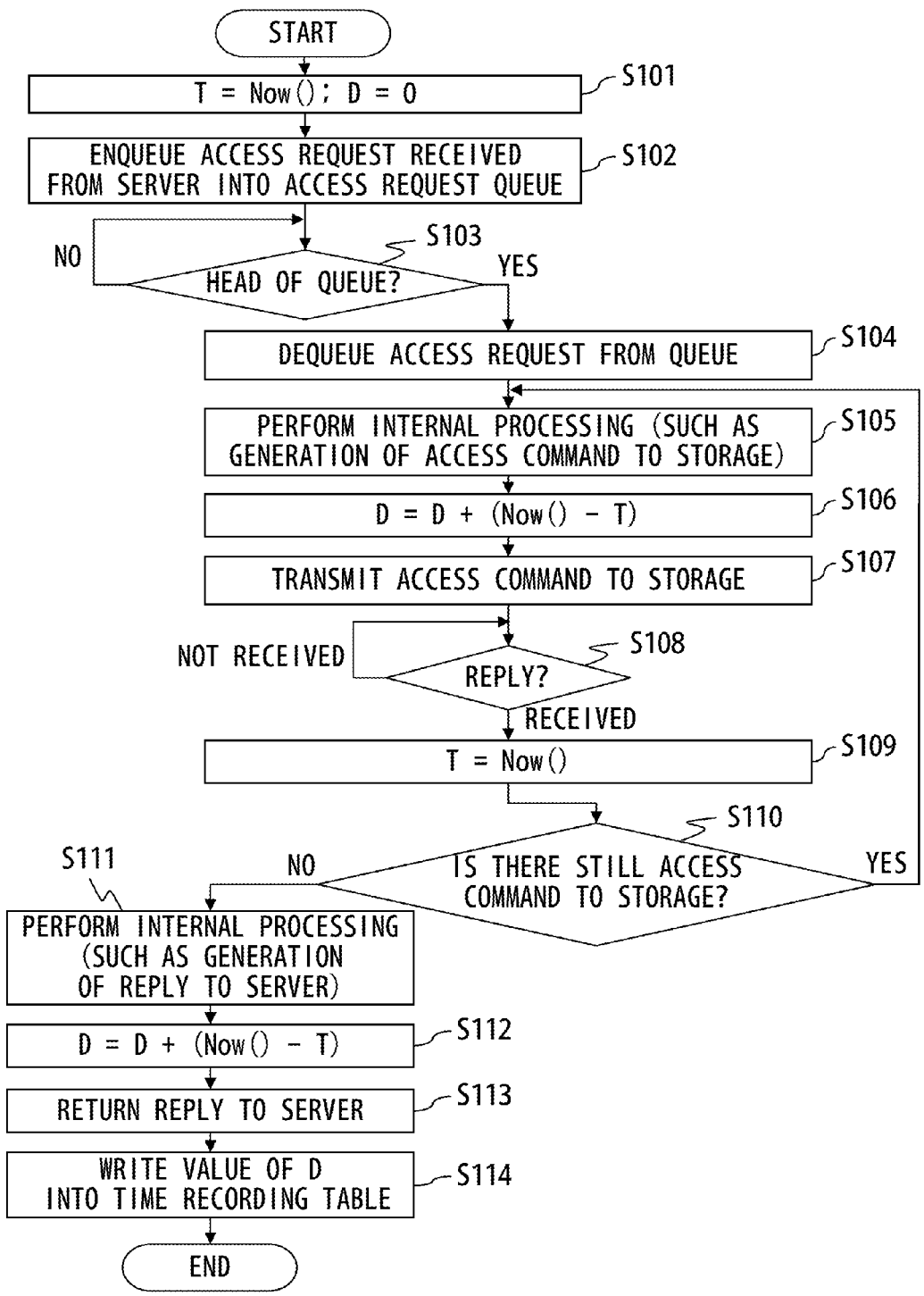
F I G. 11

| STORAGE CONTROLLER NUMBER | STATE OF STORAGE CONTROLLE | IP ADDRESS | LOGICAL VOLUME ID |
| --- | --- | --- | --- |
| 1 | NORMAL | 10.20.40.50 | VOL_1, VOL_4 |
| 2 | NORMAL | 10.20.40.51 | VOL_2, VOL_5 |
| 3 | NORMAL | 10.20.40.52 | VOL_3 |
| 4 | ERROR | 10.20.40.53 | - |
| ... | ... | ... | ... |

313

| LOGICAL VOLUME IQN | LOGICAL VOLUME ID | STATE OF LOGICAL VOLUME | ACTIVE STORAGE CONTROLLER NUMBER | STAND-BY STORAGE CONTROLLER NUMBER |
| --- | --- | --- | --- | --- |
| IQN-TGT11111 | VOL_1 | NORMAL | 1 | 2, 3 |
| IQN-TGT22222 | VOL_2 | DELETING | 4 | 1, 3 |
| IQN-TGT33333 | VOL_3 | NORMAL | 3 | 1, 2 |
| IQN-TGT44444 | VOL_4 | NORMAL | 1 | 2, 4 |
| IQN-TGT55555 | VOL_5 | NORMAL | 2 | 1, 3 |
| ... | ... | ... | ... | ... |

| SERVER ID | SERVER IQN | LOGICAL VOLUME ID |
|---|---|---|
| SRV_1 | IQN1111111 | VOL_1, VOL_2 |
| SRV_2 | IQN2222222 | VOL_3, VOL_4 |
| SRV_3 | IQN3333333 | VOL_5 |
| ... | ... | ... |

316

| LOGICAL VOLUME ID | LOGICAL VOLUME IQN | IP ADDRESS | STATE OF PATH |
|---|---|---|---|
| VOL_5 | IQN-TGT55555 | 10.20.40.50 | STANDBY |
| | | 10.20.40.51 | ACTIVE |
| | | 10.20.40.52 | STANDBY |

FIG. 15

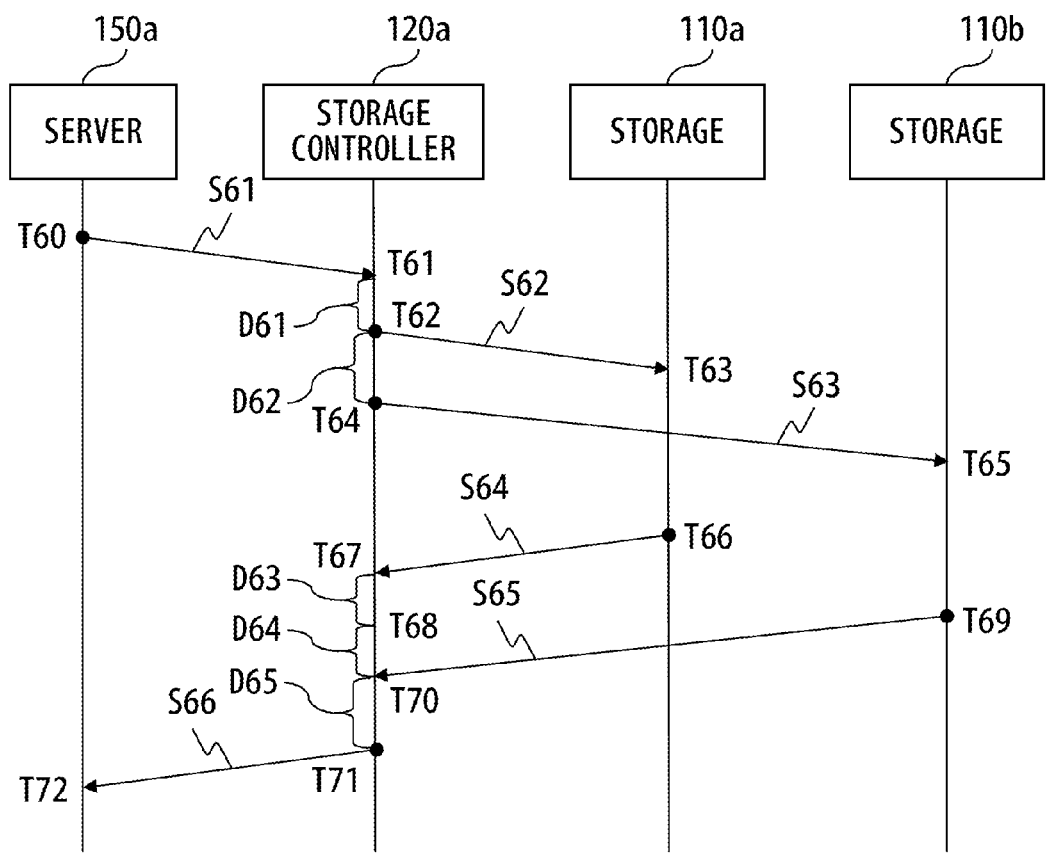
F I G. 16

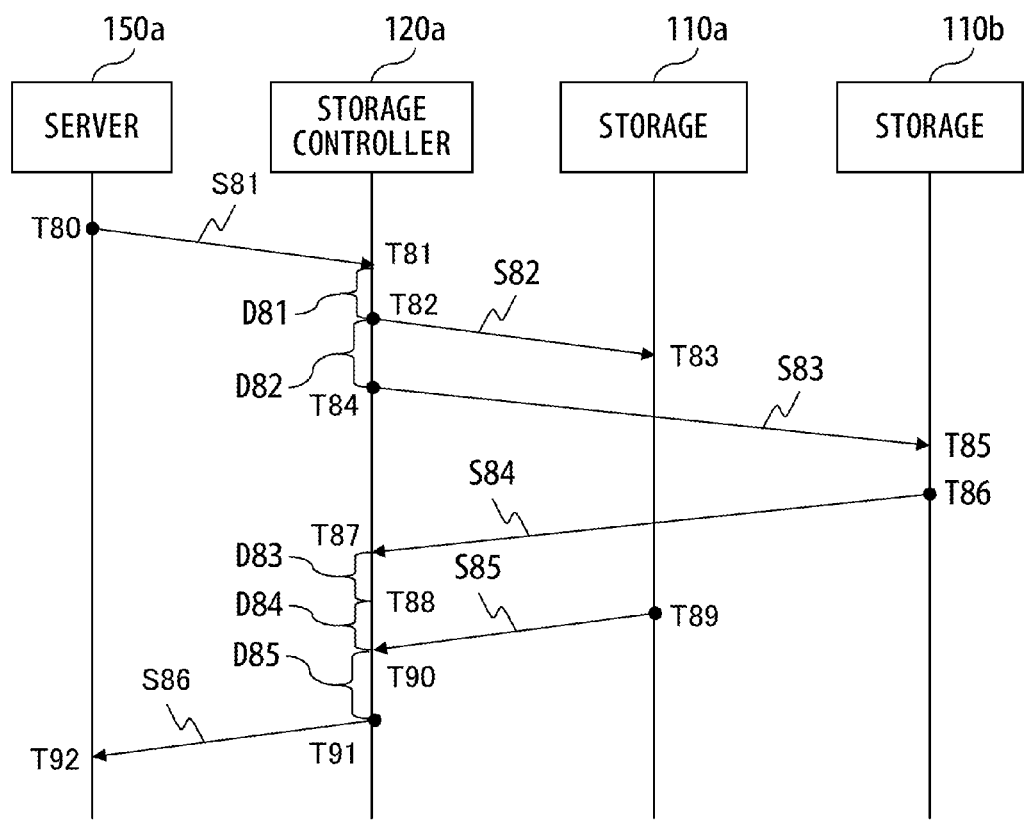
F I G. 17

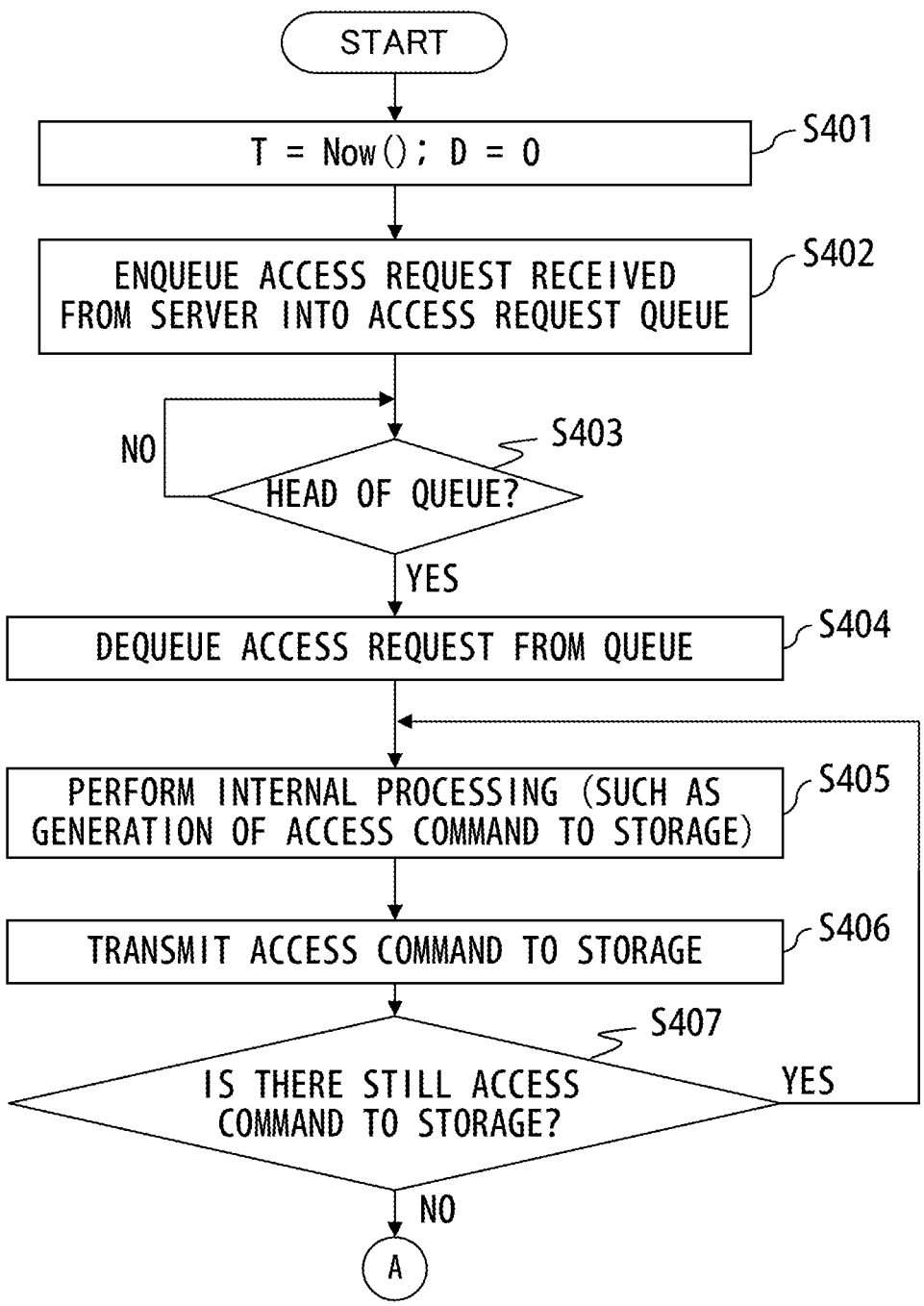
F I G. 18

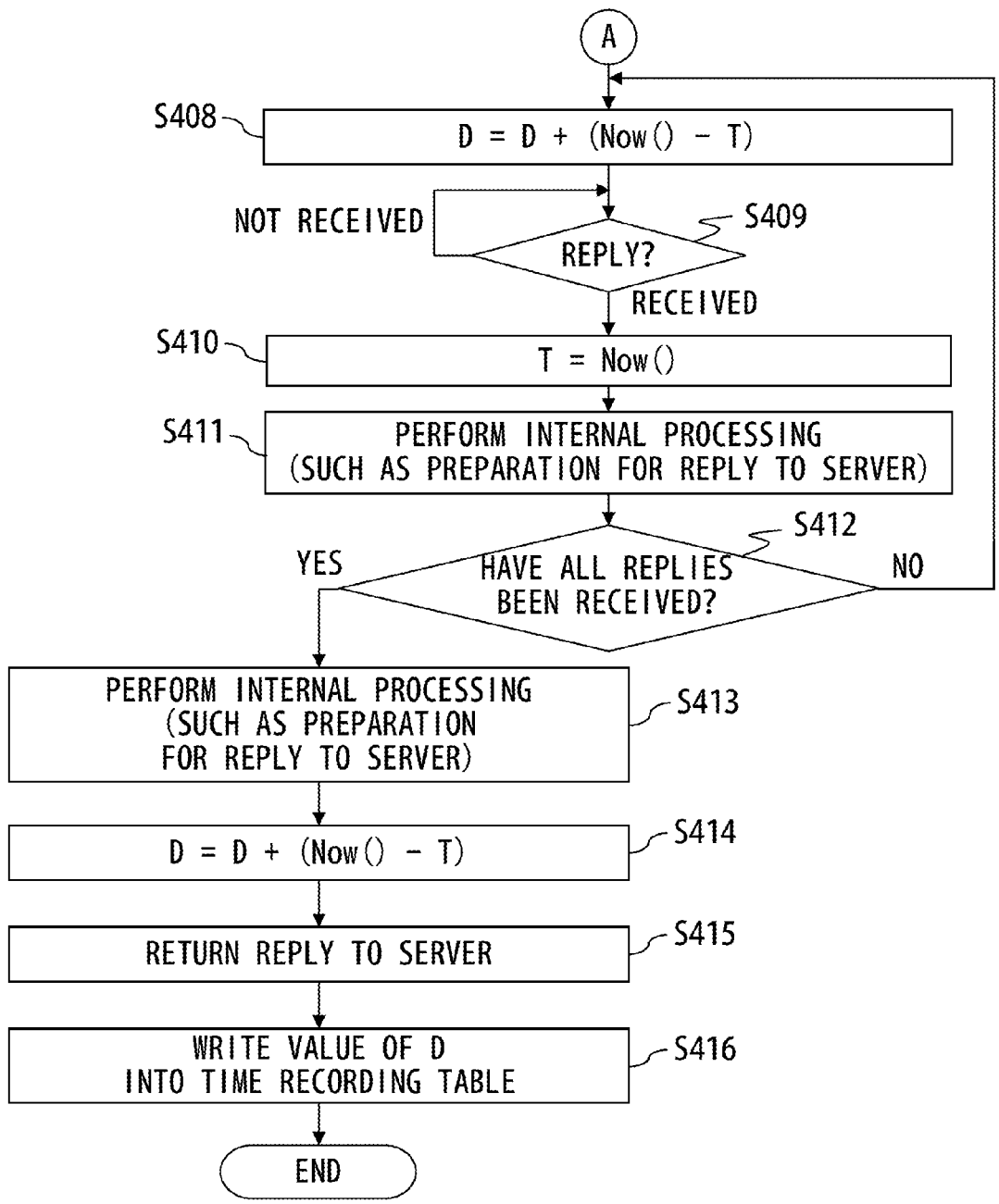
F I G. 19

STORAGE CONTROLLER SELECTING SYSTEM, STORAGE CONTROLLER SELECTING METHOD, AND RECORDING MEDIUM

CROSS-REFERENCE TO RELATED APPLICATION

This application is based upon and claims the benefit of priority of the prior Japanese Patent Application No. 2012-286291, filed on Dec. 27, 2012, the entire contents of which are incorporated herein by reference.

FIELD

The embodiments discussed herein relate to a technique of selecting a storage controller.

BACKGROUND

A large number of storage systems are used in data centers, individual companies, and the like. Some storage systems include a plurality of storage controllers.

In the case where a new logical volume is created in such a system including a plurality of storage controllers, the data access performance (i.e., the input/output performance) is influenced by which storage controller manages the new logical volume. That is, if an access request to the new logical volume is issued after the creation of the new logical volume, the performance (for example, latency) concerning this access request may vary depending on which storage controller manages the new logical volume.

Accordingly, it is desirable to select an appropriate storage controller such that preferable data access performance can be obtained. An aspect of the selection relates to load balancing.

The load balancing is studied in various fields including not only the field of storage systems but also the fields of server clusters, data distribution among a plurality of computers, and the like.

For example, a certain data distribution method is a method for distributing data processed by a plurality of computers, to each computer. The data distribution method is intended to distribute, to the plurality of computers, data having an appropriate size depending on the throughput of each computer, to thereby make the best use of the throughput of each computer at the time of data processing.

Specifically, the data distribution method includes a step of acquiring the throughput of each computer to which the data is to be distributed and storing the acquired throughput in a storage device. The data distribution method further includes a step of acquiring the size of data to be distributed to each of the plurality of computers and storing the acquired data size in the storage device. The data distribution method further includes a step of reading the stored throughput and the stored data size from the storage device, calculating an expected time for each computer to process the data, and deciding to which computer the data is to be distributed, according to the calculation results.

Here, a method that may be adopted to acquire the throughput includes, for example, measuring a processing time for test data, storing the measured processing time in a storage device, and calculating the throughput from the value of the processing time. Measurement of a processing time in a broad sense may also be performed, for example, in a certain type of agent program monitoring method in order to judge the state of the load.

Some documents, such as Japanese Laid-open Patent Publication Nos. 2003-36210 and 2006-113868, are known.

SUMMARY

According to an aspect of the embodiments, a storage controller selecting system includes a time information storage unit, a receiver, and a processor.

The time information storage unit is configured to store internal processing time information for each of a plurality of storage controllers. The internal processing time information for each individual storage controller relates to an internal processing time taken for processing performed within the individual storage controller in response to an access request to a logical volume.

The receiver is configured to receive a creation request for requesting creation of a new logical volume. The processor is configured to select a certain storage controller from among the plurality of storage controllers according to the internal processing time information, and to cause the certain storage controller to create the new logical volume.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a flowchart of a storage controller selecting method;

FIG. 2 is a diagram for describing the addition of a new logical volume in a storage system;

FIG. 3 is a diagram for describing fragmentation of a logical volume, active paths, and stand-by paths;

FIG. 5 is a system configuration diagram;

FIG. 10 is a diagram (No. 1) illustrating various pieces of data;

FIG. 11 is a flowchart of the processing that a storage controller of a first embodiment performs upon receipt of an access request;

FIG. 14 is a diagram (No. 2) illustrating various pieces of data;

FIG. 15 is a diagram (No. 3) illustrating various pieces of data;

FIG. 16 is a sequence diagram (No. 5) for describing the internal processing time;

FIG. 17 is a sequence diagram (No. 6) for describing the internal processing time;

FIG. 18 is a flowchart (Part 1) of the processing that a storage controller of a second embodiment performs upon receipt of an access request; and FIG. 19 is a flowchart (Part 2) of the processing that the storage controller of the second embodiment performs upon receipt of the access request.

DESCRIPTION OF EMBODIMENTS

Figure 4:
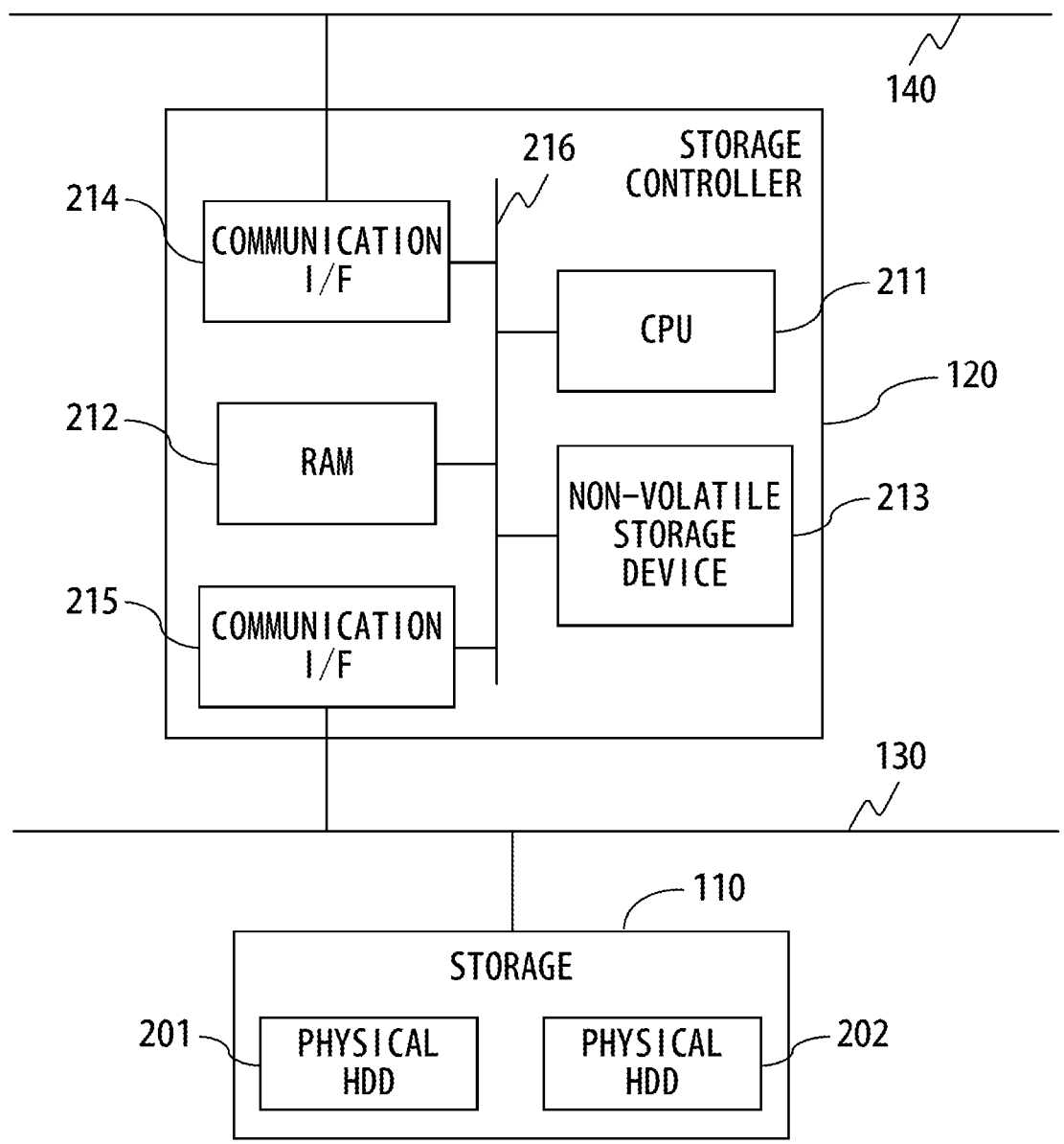
FIG. 4 is a hardware configuration diagram of a storage and a storage controller.

Load balancing is studied in various fields. Unfortunately, the same method is not necessarily equally effective in any fields. For the selection of a storage controller, if a technique suited to storage systems is used instead of applying a load balancing technique developed for fields different from the field of storage systems, a more preferable storage controller is expected to be selected.

In view of the above, each of the following embodiments has an object to achieve proper selection of a storage controller for managing a new logical volume such that preferable data access performance can be obtained.

Hereinafter, the embodiments are described in detail with reference to the drawings. Specifically, the outline of a storage controller selecting method according to a first embodiment is first described with reference to FIG. 1. A system configuration is then described with reference to FIGS. 2 to 5. After that, some examples of an internal processing time of a storage controller are described with reference to FIGS. 6 to 9. Moreover, some processes performed in the first embodiment and various pieces of data are described with reference to FIGS. 10 to 15. After that, a second embodiment is described with reference to FIGS. 16 to 19. Lastly, other modified embodiments are described.

FIG. 1 is a flowchart of the storage controller selecting method. The method of FIG. 1 is used in a storage system including a first number of logical units and a second number of storage controllers. This method is performed when a new logical volume is created. This method is designed for selecting a storage controller for managing the new logical volume. The first number is equal to or more than 2, and the second number is equal to or more than 2. The first number and the second number may be equal to each other, and may be different from each other.

Each of the first number of logical units is a set of one or more physical storage devices. In other words, one logical unit is realized by one or more physical storage devices. Each logical unit may be identified by its logical unit number (LUN).

The physical storage device is, specifically, a random-access storage device. The physical storage device may be a hard disk drive (HDD), and may be a solid-state drive (SSD), for example. In the following, the physical storage device is assumed to be an HDD for simplification of description.

The method of FIG. 1 is executed, for example, in a storage controller selecting system including a creation request receiving unit, a time storage unit, and a selection unit. The creation request receiving unit and the selection unit may be realized by, specifically, a computer that executes a program. For example, the creation request receiving unit may be a receiver, and the selection unit may be a processor.

The storage controller selecting system may share hardware with one of the storage controllers. Specifically, for example, the creation request receiving unit and the selection unit may be included in one of the second number of storage controllers. For example, in an example of FIG. 5 to be described later, a creation request receiving unit 308 and a selection unit 309 are included in a storage controller 120a, and a shared disk 170 as an example of the time storage unit is connected to the storage controller 120a via a network 130.

In the case where the creation request receiving unit and the selection unit are included in a storage controller in this way, this storage controller executes the method of FIG. 1. More specifically, a computer in a certain storage controller (that is, a processor in the certain storage controller) may execute the method of FIG. 1.

Specifically, in Step S1, the creation request receiving unit receives a creation request for requesting the creation of a new logical volume. For example, in response to an input from a user through an input device of a terminal, the creation request may be transmitted from the terminal to the creation request receiving unit.

Each logical volume in the first embodiment is a volume that is fragmented into two or more of the first number of logical units. In other words, each logical volume is distributed to two or more logical units. Further, each of the second number of storage controllers manages one or more logical volumes.

After the creation request is received in Step S1 as described above, in Step S2, the selection unit selects a storage controller for managing the new logical volume. That is, the selection unit determines which storage controller is to interface access requests to the new logical volume. Each access request may be an input request or an output request.

Specifically, the selection unit selects a storage controller whose internal processing time is relatively shorter than the internal processing time of at least another one of the second number of storage controllers, according to time information stored in the time storage unit. For example, it is preferable that the selection unit select the storage controller whose internal processing time per access request is the shortest. It is also possible that the selection unit may select, for example, the storage controller whose internal processing time is the second shortest.

Further, the selection unit may select a storage controller according to both the time information and an appropriate threshold. For example, in the case where an appropriate threshold X1 is determined, the selection unit may select any storage controller whose internal processing time is equal to or shorter than the X1-th shortest internal processing time. Similarly, in the case where an appropriate threshold X2 is determined, the selection unit may select any storage controller whose internal processing time is within the shortest X2 percent. Further, in the case where an appropriate threshold X3 is determined, the selection unit may select any storage controller whose internal processing time is equal to or less than X3.

The details of the internal processing time are described later with reference to FIGS. 6 to 9, and the outline thereof is described here.

Let a "request receiving point" be a point in time when a storage controller receives an access request to certain one logical volume of one or more logical volumes managed by this storage controller. In response to the received access request, this storage controller accesses at least one of two or more logical units into which the certain one logical volume is fragmented.

For example, upon receipt of an access request to a logical volume fragmented into four logical units, this storage controller may access only one of the four logical units. Depending on the content of the access request, this storage controller may access two of the four logical units, may access three thereof, or may access four thereof.

In any case, this storage controller accesses at least one of the two or more logical units into which the logical volume is fragmented. Then, this storage controller transmits a reply to the access request based on a result of the access to the at least one of the two or more logical units. Let a "reply transmitting point" be a point in time when this storage controller transmits the reply in this way.

The internal processing time is included in a period of time from the request receiving point to the reply transmitting point, and is a length of time taken for processing performed within this storage controller. In other words, the internal processing time is a delay time resulting from the processing performed within this storage controller.

More specifically, the internal processing time may be a time that does not include a time of waiting for the reception of the result of the access to the at least one of the two or more logical units during the period of time from the request receiving point to the reply transmitting point. This is because the waiting time is irrelevant to the performance of the storage controller.

Meanwhile, the internal processing time may include a length of time for which the access request is being queued (i.e., kept in a queue) in the storage controller. This is because the length of time for which the access request is being queued, which is influenced by other factors than the performance of the storage controller, is also influenced by the performance of the storage controller (for example, influenced by the clock frequency (i.e., clock rate) of the processor in the storage controller).

The time storage unit stores, specifically, the time information indicating the internal processing time, for each of the second number of storage controllers. Accordingly, in Step S2, the selection unit is able to select a storage controller whose internal processing time is relatively shorter, according to pieces of the time information stored in the time storage unit.

The time information may be information indicating just the internal processing time itself corresponding to a single access request. However, it is more preferable that the time information be a statistic that is calculated from the internal processing times respectively corresponding to a plurality of access requests having been issued within a certain past period of time. An example of the statistic is the arithmetic mean, and another example of the statistic is a weighted mean using weights according to the reception points in time of these access requests.

For example, each individual storage controller may measure the internal processing time that is taken for each of a plurality of access requests received by this storage controller. In addition, each individual storage controller may update the time information that is stored in the time storage unit in association with this storage controller, according to the measured internal processing time.

In this case, the time storage unit may be connected to the second number of storage controllers via a network. Further, in this case, it is enabled to update the time information as a statistic each time an access request is issued. That is, in this case, it is enabled to let the time information follow fluctuations in an actual measured value of the internal processing time. Accordingly, in Step S2, a more appropriate storage controller is selected according to the time information that reflects such fluctuations in the actual measured value.

Next, in Step S3, the selection unit instructs the selected storage controller to create a new logical volume (i.e., a new volume fragmented into two or more of the first number of logical units). Then, the processing of FIG. 1 terminates.

Note that a redundant configuration concerning the storage controllers, which is described later in detail, may be adopted. That is, the storage controller selected in Step S2 may be, specifically, an active storage controller, and the selection unit may further select a stand-by storage controller.

If the active storage controller selected in Step S2 breaks down in the future (i.e., if a failure occurs in the active storage controller in the future), the stand-by storage controller will manage the logical volume in place of the active storage controller, in response to the failure in the active storage controller. The selection unit may select an appropriate number of stand-by storage controllers, the appropriate number being equal to or more than one. The selection unit may select the stand-by storage controller(s) according to the time information, or may randomly select the stand-by storage controller(s).

According to the storage controller selecting method of FIG. 1 described above, an appropriate storage controller is selected such that preferable data access performance (i.e., preferable input/output performance) can be achieved. The reason for this is described below.

As described above, each logical volume is fragmented into two or more logical units. In addition, each logical unit is a set of one or more physical storage devices. Accordingly, the storage system includes a plurality of physical storage devices. The plurality of physical storage devices are not necessarily the same in hardware performance. Further, the storage controllers are not necessarily the same in hardware performance.

For example, the hardware performance of each physical storage device is expressed by the following items.

Seek time (for example, an average seek time, a minimum seek time, and a maximum seek time)
Rotational speed of a disk
Data transfer rate
Capacity of a cache memory Further, the hardware performance of each storage controller is expressed by, for example, the following items.

The number of processors such as central processing units (CPUs) in the storage controller
Clock frequency of each processor
The number of cores in each processor
Capacity of a cache memory in each processor
Capacity of a memory such as a dynamic random access memory (DRAM) in the storage controller
Access speed of the memory such as the DRAM in the storage controller It is assumed here that every logical unit into which a certain logical volume is fragmented is realized by one or more physical storage devices having low hardware performance. In this case, the data access performance concerning access requests to this logical volume is low. Conversely, in the case where every logical unit into which a certain logical volume is fragmented is realized by one or more physical storage devices having high hardware performance, the data access performance concerning access requests to this logical volume is high.

Note that the data access performance concerning an access request may be, specifically, the performance measured by latency, for example. As the latency is shorter, the data access performance is higher.

As described above, there is a possibility that such a difference in hardware performance among the physical storage devices may lead to a difference in data access performance. This possibility can be reduced to some degree by appropriately associating a logical volume with logical units.

This is because each logical volume is fragmented into two or more logical units as described above. Accordingly, an appropriate determination as to how many and which logical units one logical volume is to be fragmented into allows the difference in hardware performance among the physical storage devices to be absorbed to some degree. As a result, it is enabled, to some degree, to equalize the data access performance among the logical volumes.

Unfortunately, the data access performance is not necessarily sufficiently equalized by only absorbing the difference in hardware performance among the physical storage devices in such a manner as described above. This is because, firstly, the amount of access requests may be different among the logical volumes. Then, secondly, the hardware performance may be different among the storage controllers as described above.

As described above, each storage controller manages one or more logical volumes. Meanwhile, the amount of access requests to each logical volume may be different. The amount of access requests may be measured by, for example, the number of access requests per unit time or the amount of data transferred in response to access requests per unit time. In any case, the amount of access requests may be different for each logical volume. Depending on the usage of each of the plurality of logical volumes, the amount of access requests may significantly vary from logical volume to logical volume.

If the amount of access requests to a certain logical volume is very large, the load on the storage controller that manages the certain logical volume increases, and the load on the physical storage devices that realize the logical units into which the certain logical volume is fragmented increases accordingly. Then, such an increase in load causes a decrease in the data access performance concerning access requests to the certain logical volume. Conversely, if the amount of access requests to a certain logical volume is very small, the load has little harmful influence on the data access performance concerning access requests to the certain logical volume.

In a different perspective, the load on a storage controller that manages a logical volume to which a large amount of access requests are issued is high. Conversely, the load on a storage controller that manages only a logical volume to which a small amount of access requests are issued is low. That is, the load on each storage controller depends on not only the number of logical volumes managed by this storage controller (in other words, the number of logical volumes for which this storage controller is responsible) but also the amount of access requests to each logical volume.

Moreover, the load on each storage controller is not simply influenced by the amount of access requests. Even if the amount of access requests itself is the same, the load on a storage controller having low hardware performance is relatively higher than the load on a storage controller having high hardware performance.

Then, the data access performance concerning an access request processed by a high-load storage controller is lower than the data access performance concerning an access request processed by a low-load storage controller. For example, as the load on the storage controller is higher, the latency tends to be longer.

Accordingly, even if the amount of access requests may be equalized among the logical volumes, the imbalance in the data access performance resulting from the difference in hardware performance among the storage controllers may still remain unsolved.

For example, the following case is assumed.

The amount of access requests is equalized among the logical volumes.

Each storage controller manages the same number of logical volumes.

Even in such a case, the load on a storage controller having low hardware performance is higher than the load on a storage controller having high hardware performance. Accordingly, the data access performance concerning an access request to a logical volume managed by the storage controller having low hardware performance is lower than the data access performance concerning an access request to a logical volume managed by the storage controller having high hardware performance.

That is, when the hardware performance of a storage controller that manages a certain logical volume is low, the data access performance concerning an access request to the certain logical volume is low. This is because the low hardware performance of the storage controller is a bottleneck. Conversely, when the hardware performance of a storage controller that manages a certain logical volume is high, the data access performance concerning an access request to the certain logical volume is high.

As is understood from the above, for equalization of the data access performance, it is desirable to consider the difference in hardware performance among the storage controllers. The hardware performance of each storage controller is reflected in, specifically, the internal processing time of the storage controller.

Accordingly, according to the method of selecting a storage controller whose internal processing time is relatively shorter as illustrated in FIG. 1, a storage controller whose load depending on the hardware performance is relatively lower is selected. As a result, the imbalance in the data access performance resulting from the addition of a new logical volume is suppressed to be small. More detailed description is given below.

If a storage controller that has already managed one or more logical volumes is selected for further managing a new logical volume, the load on this storage controller increases. Accordingly, in order to suppress the imbalance in the data access performance resulting from the addition of the new logical volume to be small, it is desirable to select a storage controller whose load is relatively lower among all the storage controllers, as the storage controller for managing the new logical volume.

Here, as the load depending on the hardware performance of the storage controller is lower, the internal processing time is shorter. Accordingly, selecting a storage controller whose internal processing time is relatively shorter as illustrated in Step S2 means selecting a relatively lower-load storage controller (that is, a storage controller appropriate to achieve preferable data access performance with a small imbalance).

Accordingly, according to the storage controller selecting method of FIG. 1, the data access performance is further equalized by considering the difference in hardware performance among the storage controllers. Equalization of the data access performance is a preferable feature for a storage system including a plurality of logical units and a plurality of storage controllers.

Next, the system configuration of the first embodiment is described with reference to FIGS. 2 to 5. FIG. 2 is a diagram for describing the addition of a new logical volume in the storage system.

A virtual storage system 100 in FIG. 2 includes one or more storages and a plurality of storage controllers. Each storage includes one or more logical units. Specifically, FIG. 2 illustrates the case where the virtual storage system 100 includes three storages 110a to 110c and three storage controllers 120a to 120c.

The storages 110a to 110c and the storage controllers 120a to 120c are connected to a network 130. Accordingly, any storage in the virtual storage system 100 and any storage controller in the virtual storage system 100 are able to communicate with each other via the network 130. The network 130 may be a local area network (LAN) based on Ethernet, or may be a network based on Fibre Channel, for example.

In the example of FIG. 2, the storage 110a provides three logical units 111a, 112a, and 113a. In FIG. 2, the term "logical unit" is abbreviated as "LU" due to space limitations. More specifically, the storage 110a includes the following components.

A certain number of physical storage devices (for example, a certain number of HDDs) for realizing the logical units 111a to 113a Communication interface (for example, in the case where the network 130 is a LAN, a communication circuit including circuits called a "PHY chip" and a "media access control (MAC) chip") for communication between the certain number of physical storage devices and the network 130

Enclosure (i.e., chassis)

Each HDD included in the storage 110a may have a configuration of a redundant array of independent disks (RAID), or may be a simple HDD not having a RAID configuration. Instead of an HDD, an SSD may be used as a physical storage device. A storage may include both an HDD and an SSD.

Further, in the example of FIG. 2, the storage 110b provides three logical units 111b, 112b, and 113b. The storage 110b also includes a certain number of physical storage devices, a communication interface, and an enclosure.

Further, in the example of FIG. 2, the storage 110c provides three logical units 111c, 112c, and 113c. The storage 110c also includes a certain number of physical storage devices, a communication interface, and an enclosure.

In the example of FIG. 2, the numbers of the logical units provided by the storages 110a to 110c are the same as each other. Alternatively, the numbers of the logical units provided by the storages may be different from each other.

The storage controllers 120a to 120c are connected to not only the network 130 but also a network 140. The network 140 may be a local area network (LAN) based on Ethernet, or may be a network based on Fibre Channel.

In addition, one or more computers are connected to the network 140. FIG. 2 specifically illustrates a server 150a as an example of the computer, but a computer(s) such as a workstation and/or a personal computer (PC) may be connected to the network 140.

The server 150a is used for an arbitrary purpose. The server 150a may be, for example, a business server used in a company or a data center.

As illustrated in FIG. 2, a multi-path driver 151a is implemented in the server 150a. The multi-path driver 151a is a device driver for accessing a storage area in a storage through a storage controller. An operating system (OS) of the server 150a and the multi-path driver 151a do not directly recognize a logical unit in a storage, but recognize a logical volume managed by a storage controller, as a block device.

In FIG. 2, for ease of understanding, one or more logical volumes managed by each storage controller are illustrated in the storage controller, for the sake of convenience. However, the entity of each logical volume is a set of storage areas that are fragmented into two or more logical units, as described above. The term "logical volume" is abbreviated as "LV" in FIG. 2 due to space limitations.

In the example of FIG. 2, the storage controller 120a manages two logical volumes 121a and 122a, the storage controller 120b manages two logical volumes 121b and 122b, and the storage controller 120c manages one logical volume 121c.

Moreover, as illustrated by a broken line in FIG. 2, when a logical volume 122c is newly created, the storage controller 120c may be selected as a storage controller for managing the logical volume 122c. That is, in response to the creation request for creating the logical volume 122c, the storage controller 120c may be selected in Step S2 in FIG. 1. Then, in response to the instruction in Step S3, the storage controller 120c may create the logical volume 122c.

Note that a storage controller that manages a certain logical volume is, in other words, a storage controller in charge of the certain logical volume. In response to the reception of an access request (in other words, an input/output request) to the certain logical volume, the storage controller that manages the certain logical volume accesses at least one of two or more logical units into which the certain logical volume is fragmented. Then, the storage controller returns a reply based on a result of the access.

In FIG. 2, each arrow extending from each logical volume to the storage indicates which storage includes the logical unit into which this logical volume is fragmented. In other words, the arrow extending from each logical volume to the storage indicates to which storage the storage controller may transmit an access command when the storage controller receives an access request to this logical volume. More detailed description is given below.

Arrows extending from the logical volume 121a to the storages 110a and 110b indicate that the logical volume 121a is fragmented into one or more logical units in the storage 110a and one or more logical units in the storage 110b. Accordingly, when receiving an access request to the logical volume 121a from the multi-path driver 151a of the server 150a, the storage controller 120a transmits an access command to one or both of the storages 110a and 110b. Further, arrows extending from the logical volume 122a to the storages 110a and 110c indicate that the logical volume 122a is fragmented into one or more logical units in the storage 110a and one or more logical units in the storage 110c.

Arrows extending from the logical volume 121b to the storages 110a and 110b indicate that the logical volume 121b is fragmented into one or more logical units in the storage 110a and one or more logical units in the storage 110b. Further, arrows extending from the logical volume 122b to the storages 110b and 110c indicate that the logical volume 122b is fragmented into one or more logical units in the storage 110b and one or more logical units in the storage 110c.

Arrows extending from the logical volume 121c to the storages 110a and 110b indicate that the logical volume 121c is fragmented into one or more logical units in the storage 110a and one or more logical units in the storage 110b. Further, arrows extending from the logical volume 122c to the storages 110b and 110c indicate that the logical volume 122c is fragmented into one or more logical units in the storage 110b and one or more logical units in the storage 110c.

In some cases, one logical volume may be fragmented into only two or more logical units in one storage. In any case, each logical volume is fragmented into two or more logical units. Through such fragmentation, improvement in fault tolerance and throughput is expected.

In the meantime, the virtual storage system 100 is a scale-out storage system. That is, it is possible to expand (i.e., scale out) the virtual storage system 100 by adding storages and storage controllers as appropriate to the virtual storage system 100 in accordance with an increase in storage capacity desired for use by the user. In the virtual storage system 100, the following numbers may be arbitrarily determined.

The number of storages in the virtual storage system 100

The number of logical units in each storage

The total number of logical units in the virtual storage system 100

The number of storage controllers in the virtual storage system 100

The number of logical volumes managed by each storage controller

The total number of logical volumes in the virtual storage system 100

Because the virtual storage system 100 is of scale-out type, the number of storages, the total number of logical units, the number of storage controllers, and the total number of logical volumes are variable. FIG. 2 illustrates the example in which the total number of logical volumes is increased by adding the logical volume 122*c*.

In the meantime, as described above a little with reference to FIG. 1, a redundant configuration concerning the storage controllers may be adopted. Specifically, in the first embodiment, in order to enable failover in response to a failure of a storage controller, not only "active paths" but also "stand-by paths" are determined for each logical volume.

Assume that a certain logical volume is accessible from the server 150*a*. In this case, each active path for the certain logical volume is a path extending from the server 150*a* to each logical unit into which the certain logical volume is fragmented, via a storage controller that manages the certain logical volume. The storage controller that manages the certain logical volume is, in other words, an active storage controller. Meanwhile, each stand-by path for the certain logical volume is a path extending from the server 150*a* to each logical unit into which the certain logical volume is fragmented, via a stand-by storage controller.

In preparation for a failure in the active storage controller, one or more stand-by storage controllers are selected in advance. Then, if a failure occurs in the active storage controller, one of the stand-by storage controllers comes to serve as a new active storage controller, and takes charge of the certain logical volume thereafter. That is, in response to a failure of the storage controller that has served as the active storage controller so far, the active paths are changed, and the failover is realized by such a change in active paths.

FIG. 3 is a diagram for more specifically describing the fragmentation of a logical volume, the active paths, and the stand-by paths. Similarly to FIG. 2, FIG. 3 illustrates the storages 110*a* to 110*c*, the storage controllers 120*a* to 120*c*, the networks 130 and 140, and the server 150*a*. Note that only the logical volume 121*a* of the six logical volumes illustrated in FIG. 2 is illustrated in FIG. 3, and the other five logical volumes are omitted in FIG. 3.

Instead, FIG. 3 illustrates the details of the logical volume 121*a* managed by the storage controller 120*a*. Specifically, as illustrated in FIG. 3, the logical volume 121*a* includes four storage areas A to D. The entity of the storage area A is in the logical unit 111*a*, the entity of the storage area B is in the logical unit 112*a*, the entity of the storage area C is in the logical unit 111*b*, and the entity of the storage area D is in the logical unit 112*b*. That is, the logical volume 121*a* is fragmented into the four logical units 111*a*, 112*a*, 111*b*, and 112*b*.

For example, the server 150*a* recognizes the logical volume 121*a* as a block device corresponding to a device file identified by an absolute path such as "/dev/sda". On the other hand, the server 150*a* does not recognize the logical units 111*a*, 112*a*, 111*b*, and 112*b* themselves, each of which is identified by an LUN. Into which logical units the logical volume 121*a* is fragmented is hidden from the server 150*a*.

The active paths concerning the logical volume 121*a* are as follows.

Path extending from the server 150*a* to the logical unit 111*a* via the storage controller 120*a* that manages the logical volume 121*a*

Path extending from the server 150*a* to the logical unit 112*a* via the storage controller 120*a* that manages the logical volume 121*a*

Path extending from the server 150*a* to the logical unit 111*b* via the storage controller 120*a* that manages the logical volume 121*a*

Path extending from the server 150*a* to the logical unit 112*b* via the storage controller 120*a* that manages the logical volume 121*a*

For the sake of convenience in illustration, in FIG. 3, each path is represented by: an arrow extending from the server 150*a* to the logical volume 121*a*; and an arrow extending from the logical volume 121*a* to a storage including a logical unit into which the logical volume 121*a* is fragmented.

As illustrated in FIG. 3, the active storage controller in charge of the logical volume 121*a* is the storage controller 120*a*. Unfortunately, there is a possibility that a failure may occur in the storage controller 120*a* in the future. Hence, in preparation for a failure in the storage controller 120*a*, one or more stand-by storage controllers concerning the logical volume 121*a* are selected.

In the example of FIG. 3, the storage controllers 120*b* and 120*c* are selected in advance as the stand-by storage controllers concerning the logical volume 121*a*. In the case where two or more stand-by storage controllers are selected, the ordering of priority may be determined among the stand-by storage controllers. Then, if a failure occurs in the active storage controller, the stand-by storage controller with the highest priority may become a new active storage controller.

Note that, in FIG. 3, the logical volume 121*a* is illustrated by a broken line in the block of the storage controller 120*b*. The logical volume 121*a* thus illustrated by the broken line indicates that the storage controller 120*b* is to manage the logical volume 121*a* if a failure occurs in the storage controller 120*a* and if the storage controller 120*b* accordingly becomes active in response to the failure. In other words, a set of the stand-by paths concerning the logical volume 121*a* is as follows.

Path extending from the server 150*a* to the logical unit 111*a* via the storage controller 120*b*

Path extending from the server 150*a* to the logical unit 112*a* via the storage controller 120*b*

Path extending from the server 150*a* to the logical unit 111*b* via the storage controller 120*b*

Path extending from the server 150*a* to the logical unit 112*b* via the storage controller 120*b*

Similarly, in FIG. 3, the logical volume 121*a* is illustrated by a broken line also in the block of the storage controller 120*c*. The logical volume 121*a* thus illustrated by the broken line indicates that the storage controller 120*c* is to manage the logical volume 121*a* if a failure occurs in the storage controller 120*a* and if the storage controller 120*c* accordingly becomes active in response to the failure. In other words, another set of the stand-by paths concerning the logical volume 121*a* is as follows.

Path extending from the server 150*a* to the logical unit 111*a* via the storage controller 120*c*

Path extending from the server 150*a* to the logical unit 112*a* via the storage controller 120*c*

Path extending from the server 150*a* to the logical unit 111*b* via the storage controller 120*c*

Path extending from the server 150*a* to the logical unit 112*b* via the storage controller 120*c*

In the virtual storage system 100, for each logical volume, the stand-by paths are also determined in advance in addition to the active paths, as exemplified above. The multi-path driver 151*a* of the server 150*a* recognizes in advance the active paths and the stand-by paths. An access request to a logical volume is transmitted by the multi-path driver 151a to the storage controller on the active paths concerning this logical volume.

Note that, if failover occurs, paths which have been the stand-by paths so far newly become the active paths. The multi-path driver 151a transmits an access request to the storage controller on the active paths, in accordance with the active paths at the time of the transmission of the access request.

For example, while the storage controller 120a is normally operating, the multi-path driver 151a transmits, to the storage controller 120a, an access request to the logical volume 121a. If a failure occurs in the storage controller 120a and the storage controller 120b becomes a new active storage controller, the multi-path driver 151a transmits, to the storage controller 120b, an access request to the logical volume 121a.

For example, after the multi-path driver 151a transmits, to the storage controller 120a, an access request to the logical volume 121a, the multi-path driver 151a waits for the reception of a reply from the storage controller 120a. When the reply from the storage controller 120a is not received within a predetermined length of time from the transmission of the access request, the multi-path driver 151a may judge that a failure has occurred in the storage controller 120a, which is on the current active paths. Moreover, the multi-path driver 151a may judge, for example, that the active storage controller concerning the logical volume 121a has been switched from the storage controller 120a to the storage controller 120b. Then, the multi-path driver 151a may transmit the access request to the storage controller 120b. The failover is realized in such a manner as described above, for example.

Note that, although omitted in FIG. 3, the virtual storage system 100 includes a shared storage device (for example, the shared disk 170 in FIG. 5) accessible from each storage controller. When the logical volume 121a is created, "correspondence information" is stored into the shared storage device. The correspondence information indicates to which logical unit each of the storage areas A to D of the logical volume 121a corresponds.

Accordingly, if the failover occurs, the storage controller 120b that has newly become active refers to the correspondence information stored in the shared storage device, and is thereby able to recognize into which logical units the logical volume 121a is fragmented. According to this recognition, the storage controller 120b is enabled to manage the logical volume 121a thereafter. That is, on the basis of this recognition, the storage controller 120b is able to appropriately transmit an access command to one or both of the storages 110a and 110b in response to the reception of an access request to the logical volume 121a.

In the meantime, through such fragmentation of the logical volume as exemplified in FIG. 3, improvement in fault tolerance is expected, and improvement in throughput is also expected. In addition, the fragmentation also produces a further effect. That is, the fragmentation also produces the above-mentioned effect that the data access performance can be equalized to some degree by absorbing the difference in hardware performance among the physical storage devices to some degree. This effect is particularly advantageous in a scale-out system such as the virtual storage system 100.

This is because the hardware performance tends to be uneven among storages in the scale-out storage system. Because the hardware performance of storages is improved year after year, the hardware performance of storages that are added to the system later is higher than the hardware performance of storages that have already been included in the system, in many cases. Accordingly, in order to equalize the data access performance in a system including a plurality of storages among which the hardware performance is not uniform, it is desirable that each logical volume be fragmented into two or more logical units as exemplified in FIG. 3.

Unfortunately, as described above, the data access performance is not necessarily sufficiently equalized by only absorbing the difference in hardware performance among the physical storage devices. One of the reasons therefor is that, as described above, the amount of access requests may be different among the logical volumes.

For example, in the example of FIG. 2, the state before the addition of the logical volume 122c is as follows.

The storage controller 120a is in charge of the two logical volumes 121a and 122a. That is, the storage controller 120a is on the active paths concerning the logical volume 121a, and is also on the active paths concerning the logical volume 122a.

The storage controller 120b is in charge of the two logical volumes 121b and 122b. That is, the storage controller 120b is on the active paths concerning the logical volume 121b, and is also on the active paths concerning the logical volume 122b.

The storage controller 120c is in charge of the one logical volume 121c. That is, the storage controller 120c is on the active paths concerning the logical volume 121c.

If the amount of access requests is substantially the same among all the logical volumes, the storage controller for managing the new logical volume 122c may be determined simply in accordance with how many logical volumes each storage controller is currently in charge of. In many cases, however, the amount of access requests is not uniform among the logical volumes. Accordingly, in order to achieve the load balancing among the storage controllers and equalization of the data access performance resulting from the load balancing, such a method of simply focusing on the number of logical volumes that each storage controller is currently in charge of is not sufficient.

Further, even if the amount of access requests is substantially the same among the logical volumes, in the case where the difference in hardware performance exists among the storage controllers, the imbalance in the data access performance resulting from the difference in hardware performance among the storage controllers exists. In particular, the hardware performance tends to be uneven among the storage controllers in the scale-out storage system such as the virtual storage system 100. The reason is as follows. Because the hardware performance of storage controllers is improved year after year, the hardware performance of storage controllers that are added to the system later is higher than the hardware performance of storage controllers that have already been included in the system, in many cases.

That is, a load resulting from a certain amount of access requests may be different depending on the hardware performance of a storage controller. Accordingly, as illustrated in FIG. 1, it is desirable to select a relatively lower-load storage controller as an active storage controller for a new logical volume on the basis of values that reflect the hardware performance of the storage controllers (specifically, values indicating the internal processing times of them). The selecting method of FIG. 1 achieves reduction in the imbalance in the data access performance resulting from the difference in hardware performance among the storage controllers, and thereby also achieves further equalization of the data access performance.

FIG. 4 is a hardware configuration diagram of a storage and a storage controller. Each of the storages 110a to 110c illustrated in FIGS. 2 and 3 may be configured as a storage 110 in FIG. 4. Further, each of the storage controllers 120a to 120c illustrated in FIGS. 2 and 3 may be configured as a storage controller 120 in FIG. 4.

The storage 110 includes two physical HDDs 201 and 202. The number of physical HDDs included in the storage 110 may be arbitrarily determined. Further, the storage 110 may include SSDs instead of the HDDs (or together with the HDDs). Although omitted in FIG. 4, the storage 110 also includes a communication interface for communication between the physical HDDs 201 and 202 and the network 130. The physical HDDs 201 and 202 and the communication interface are housed in an enclosure.

The storage controller 120 includes a CPU 211, a random access memory (RAM) 212, a non-volatile storage device 213, a communication interface 214, and a communication interface 215. These components included in the storage controller 120 are connected to one another by a bus 216. Note that the term "interface" is abbreviated as "I/F" in FIG. 4.

The CPU 211 is a single-core or multi-core processor. The storage controller 120 may include two or more CPUs 211.

The CPU 211 loads, onto the RAM 212, a program installed in the non-volatile storage device 213, and executes the program while using the RAM 212 also as a working area. Depending on embodiments, a hardware circuit such as an application-specific integrated circuit (ASIC) may be used instead of (or together with) the CPU 211, which is a general-purpose processor.

The non-volatile storage device 213 may be a flash memory, a built-in HDD in the storage controller 120, or a built-in SSD in the storage controller 120, for example.

The communication interface 214 is a circuit for enabling the storage controller 120 to communicate via the network 140. For example, in the case where the network 140 is a LAN based on Ethernet, the communication interface 214 may be a communication circuit including a PHY chip and a MAC chip. In the case where the network 140 is a network based on Fibre Channel, the communication interface 214 may be a host bus adapter for Fibre Channel.

Further, the communication interface 215 is a circuit for enabling the storage controller 120 to communicate via the network 130. For example, in the case where the network 130 is a LAN based on Ethernet, the communication interface 215 may be a communication circuit including a PHY chip and a MAC chip. In the case where the network 130 is a network based on Fibre Channel, the communication interface 215 may be a host bus adapter for Fibre Channel.

FIG. 5 is a system configuration diagram. FIG. 5 illustrates the storages 110a and 110b similarly to FIGS. 2 and 3. In FIG. 5, the storage 110c is omitted, and the details of the storages 110a and 110b are also omitted, due to space limitations.

Further, FIG. 5 illustrates the storage controllers 120a and 120b similarly to FIGS. 2 and 3. In FIG. 5, the storage controller 120c is omitted due to space limitations. In FIGS. 2 and 3, for the sake of convenience and for ease of understanding of the correspondence between each storage controller and the logical volume(s), the logical volume(s) is/are illustrated in the block of each storage controller. On the other hand, the illustration of the logical volumes is omitted in FIG. 5. Instead, in FIG. 5, functional blocks inside of the storage controllers 120a and 120b are illustrated.

FIG. 5 further illustrates the network 130, the network 140, and the server 150a similarly to FIGS. 2 and 3. Note that, although omitted in FIGS. 2 and 3, another server 150b may be connected to the network 140 as illustrated in FIG. 5. Further, a terminal 160 for transmitting an instruction to an arbitrary storage controller in the virtual storage system 100 is also connected to the network 140.

In addition, FIG. 5 illustrates the shared disk 170 connected to the network 130, as an example of a shared storage device accessible from any storage controller in the virtual storage system 100. The shared disk 170 may be, specifically, a single physical HDD.

As illustrated in FIG. 5, the storage controller 120a includes an access request receiving unit 301a, an access request queue 302a, an access command executing unit 303a, a control unit 304a, and a storage unit 305a. FIG. 5 also illustrates a time recording table 306a stored in the storage unit 305a.

The access request receiving unit 301a receives an access request to any of the logical volumes managed by the storage controller 120a, from the server 150a (more specifically, the multi-path driver 151a) or the server 150b via the network 140. Then, the access request receiving unit 301a enqueues the received access request into the access request queue 302a.

The access command executing unit 303a dequeues the head access request, which is the access request at the head of the access request queue 302a, from the access request queue 302a, and then executes access processing in response to the dequeued access request. For example, the access command executing unit 303a determines which address of which logical unit is to be accessed, on the basis of a parameter(s) of the access request to the logical volume, and generates an access command to an appropriate storage in accordance with the determination. An access command to a storage is, in other words, a kind of an access request to the storage. As in examples of FIGS. 8 and 9 to be described later, the access command executing unit 303a may generate two or more access commands to a storage or storages in response to one access request received from the server 150a.

The access command executing unit 303a transmits each generated access command to the appropriate storage via the network 130, and receives a reply from the storage. Then, on the basis of each received reply, the access command executing unit 303a generates a reply to the original access request dequeued from the access request queue 302a (that is, generates a reply to the access request from the server 150a or 150b). The reply thus generated is transmitted by the access request receiving unit 301a to the server 150a or 150b via the network 140.

For example, in the case where the access request from the server 150a is, specifically, a write request, a reply indicating whether or not data writing has been completed successfully may be returned to the server 150a. Conversely, in the case where the access request from the server 150a is a read request, a reply including data read out of the storage is returned to the server 150a.

The control unit 304a controls a flow of processing that ranges from the reception of an access request to the transmission of a reply and that is executed by the access request receiving unit 301a and the access command executing unit 303a, while measuring the internal processing time of the storage controller 120a. Then, the control unit 304a records the measured internal processing time into the time recording table 306a. Moreover, the control unit 304a periodically performs aggregate calculation on the basis of the time recording table 306a.

The details of the time recording table 306a are described later with reference to FIG. 10. Further, the details of processing performed by the access request receiving unit 301a, the access command executing unit 303a, and the control unit 304a are described later with reference to FIGS. 11 and 12.

The access request receiving unit 301a may be realized by the communication interface 214 and the CPU 211. It is desirable that the access request queue 302a be realized by the RAM 212, but the access request queue 302a may be realized by the non-volatile storage device 213. The access command executing unit 303a may be realized by the CPU 211 and the communication interface 215. The control unit 304a may also be realized by the CPU 211 and the communication interface 215. The storage unit 305a may be realized by one or both of the RAM 212 and the non-volatile storage device 213.

Similarly to the storage controller 120a as described above, the storage controller 120b also includes an access request receiving unit 301b, an access request queue 302b, an access command executing unit 303b, a control unit 304b, and a storage unit 305b. The storage unit 305b stores a time recording table 306b therein. The storage controller 120c, which is omitted in FIG. 5, also includes components similar to those of the storage controller 120b.

In the first embodiment, the access request queues of all the storage controllers in the virtual storage system 100 have the same capacity. This is in order to prevent an undesirable situation in which the data access performance varies from storage controller to storage controller due to variations in queuing time among the storage controllers caused by a difference in capacity among the access request queues.

Further, in the first embodiment, one of the plurality of storage controllers in the virtual storage system 100 includes a management unit 307 for performing the processing whose outline is illustrated in FIG. 1. In the example of FIG. 5, the storage controller 120a includes the management unit 307. The management unit 307 includes the creation request receiving unit 308 and the selection unit 309.

The creation request receiving unit 308 executes the processing in Step S1 in FIG. 1. Specifically, the creation request receiving unit 308 receives a creation request for creating a new logical volume, from the terminal 160 via the network 140. Further, the selection unit 309 executes the processing in Steps S2 and S3 in FIG. 1. That is, the selection unit 309 selects one storage controller from among the plurality of storage controllers in the virtual storage system 100, and instructs the selected storage controller to create the new logical volume. In the first embodiment, the time information that the selection unit 309 refers to when performing the selection in Step S2 is, specifically, data in a secondary aggregate table 312 to be described later.

The details of an operation of the management unit 307 and specific examples of the data used by the management unit 307 are described later with reference to FIGS. 13 to 15. Meanwhile, the creation request receiving unit 308 may be realized by the communication interface 214 and the CPU 211, and the selection unit 309 may be realized by the CPU 211 and the communication interface 215.

In addition, as illustrated in FIG. 5, the shared disk 170 stores therein, for example, primary aggregate tables 311, the secondary aggregate table 312, a storage controller management table 313, a logical volume management table 314, and a server management table 315. Specific examples of these tables are described later with reference to FIGS. 10, 14, and 15.

Further, although omitted in FIG. 5, it is assumed that the shared disk 170 further stores therein correspondence information indicating into which logical units each logical volume is fragmented. As described above with reference to FIG. 3, the correspondence information is referred to by a storage controller that newly becomes active when failover occurs.

Next, the internal processing time of the storage controller is described further in detail with reference to sequence diagrams of FIGS. 6 to 9.

The sequence diagram of FIG. 6 exemplifies the case as follows.

The server 150a transmits an access request to a certain logical volume managed by the storage controller 120a.

The area accessed in response to this access request is, specifically, included in certain one of the logical units in the storage 110a.

The storage controller 120a accesses this certain logical unit only once.

Specifically, as illustrated in Step S11, the server 150a transmits an access request to the storage controller 120a via the network 140 at a time T10. Then, the storage controller 120a receives the access request at a time T11.

Note that the access request transmitted in Step S11 is, specifically, an access request to a certain logical volume managed by the storage controller 120a. The access request may be a read request, or may be a write request.

After that, as illustrated in Step S12, the storage controller 120a transmits an access command to the storage 110a via the network 130 at a time T12. Then, the storage 110a receives the access command at a time T13.

Note that both the access request transmitted in Step S11 and the access command transmitted in Step S12 may be, for example, Internet Small Computer System Interface (iSCSI) commands. Depending on embodiments, a network storage protocol (for example, the Fibre Channel protocol) other than the iSCSI may be used.

The storage 110a accesses a physical storage device (for example, an HDD) in accordance with the received access command. Then, as illustrated in Step S13, the storage 110a returns a reply to the storage controller 120a via the network 130 at a time T14.

For example, in the case where the access command received by the storage 110a is a read command (i.e., a read request), the reply includes the data having been read. Alternatively, in the case where the access command received by the storage 110a is a write command (i.e., a write request), the reply includes status information indicating whether or not the write command has been completed successfully.

The reply returned by the storage 110a is received by the storage controller 120a at a time T15. After that, as illustrated in Step S14, the storage controller 120a returns a reply to the server 150a via the network 140. Then, the server 150a receives the reply at a time T17.

The data access performance for the server 150a is indicated by, for example, latency (that is, a length of time from the time T10 to the time T17). The latency is influenced by various factors such as the bandwidths of the networks 130 and 140, the hardware performance of the storage controller 120a, and the hardware performance of the storage 110a.

Meanwhile, as described above with reference to FIG. 1, in the first embodiment, selection based on the internal processing time of each storage controller is performed when a new logical volume is added. An internal processing time D of the storage controller 120a in the example of FIG. 6 is as indicated in Formula (1). The internal processing time D reflects the hardware performance of the storage controller 120a.

$$D = D11 + D12 \quad (1)$$
$$= (T12 - T11) + (T16 - T15)$$

For example, the internal processing time D11 includes: a length of time for which the access request transmitted by the server 150a in Step S11 is being queued in the access request queue 302a; and a length of time for which the access command executing unit 303a generates the access command to be transmitted in Step S12. Further, the internal processing time D12 includes a length of time for which the access command executing unit 303a generates the reply to be returned to the server 150a, from the reply received in Step S13.

Figure 6:
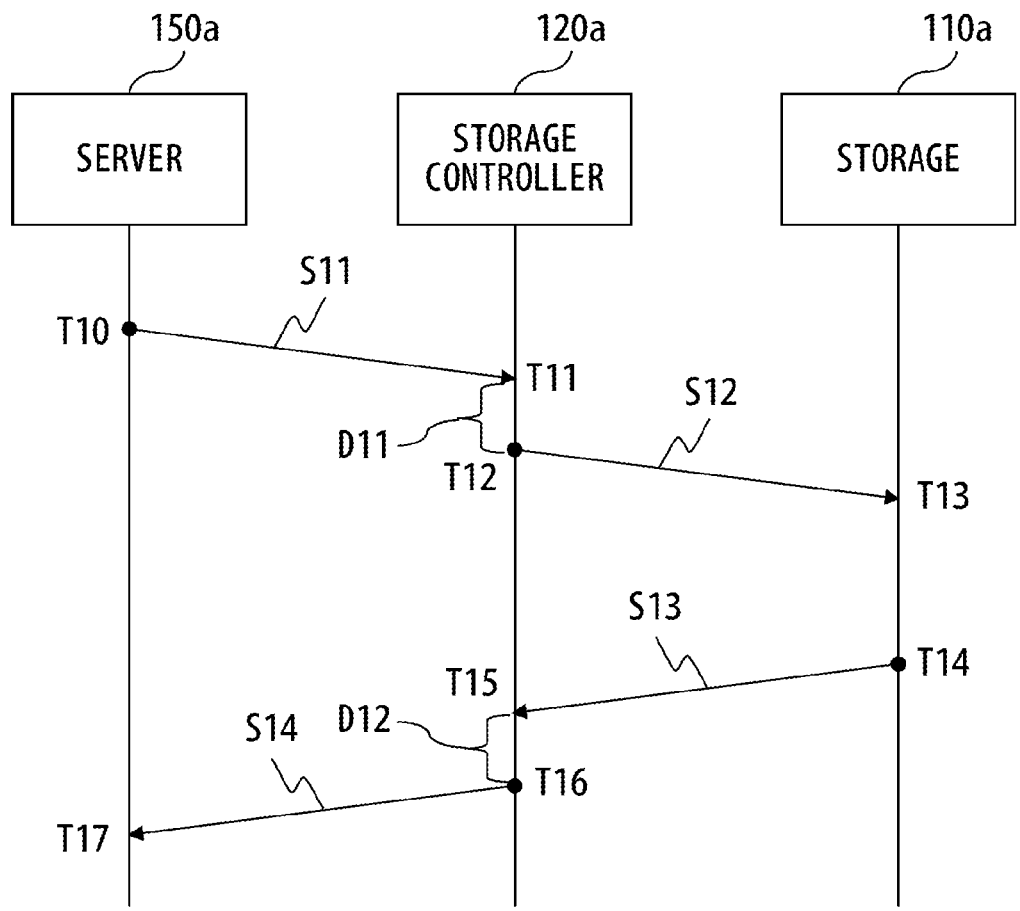
FIG. 6 is a sequence diagram (No. 1) for describing an internal processing time.
Figure 7:
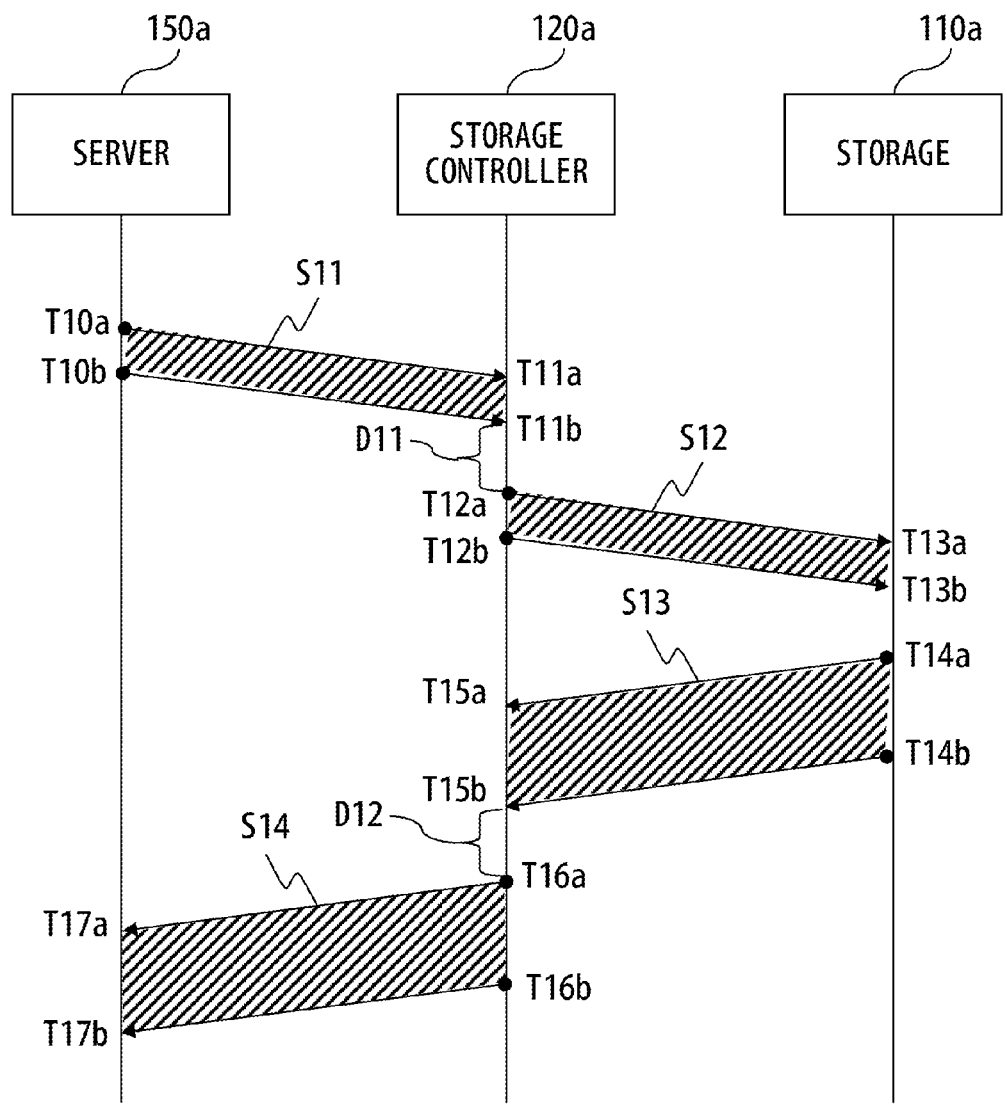
FIG. 7 is a sequence diagram (No. 2) for describing the internal processing time.

In the meantime, in FIG. 6, for simplification of description, a length of time from the start to the completion of the reception of each access request or reply is ignored, and, similarly, a length of time from the start to the completion of the transmission of each access command or reply is ignored. In actuality, it takes some time from the start to the completion of the reception of each access request or reply, and it also takes some time from the start to the completion of the transmission of each access command or reply. FIG. 7 illustrates the details of the operation sequence of FIG. 6.

As illustrated in FIG. 7, the details of the transmission and reception of the access request in Step S11 are as follows.

The server 150a starts the transmission of the access request at a time T10a, and completes the transmission of the access request at a time T10b.

The storage controller 120a starts the reception of the access request at a time T11a, and completes the reception of the access request at a time T11b.

Further, the details of the transmission and reception of the access command in Step S12 are as follows.

The storage controller 120a starts the transmission of the access command at a time T12a, and completes the transmission of the access command at a time T12b.

The storage 110a starts the reception of the access command at a time T13a, and completes the reception of the access command at a time T13b.

Then, the details of the transmission and reception of the reply in Step S13 are as follows.

The storage 110a starts the transmission of the reply at a time T14a, and completes the transmission of the reply at a time T14b.

The storage controller 120a starts the reception of the reply at a time T15a, and completes the reception of the reply at a time T15b.

Further, the details of the transmission and reception of the reply in Step S14 are as follows.

The storage controller 120a starts the transmission of the reply at a time T16a, and completes the transmission of the reply at a time T16b.

The server 150a starts the reception of the reply at a time T17a, and completes the reception of the reply at a time T17b.

In the first embodiment, specifically, a length of time from the time T11b to the time T12a is measured as the time D11 taken for internal processing. That is, the time T11 in FIG. 6 is, more specifically, the time T11b in FIG. 7, and the time T12 in FIG. 6 is, more specifically, the time T12a in FIG. 7.

Further, in the first embodiment, specifically, a length of time from the time T15b to the time T16a is measured as the time D12 taken for internal processing. That is, the time T15 in FIG. 6 is, more specifically, the time T15b in FIG. 7, and the time T16 in FIG. 6 is, more specifically, the time T16a in FIG. 7.

That is, in FIG. 6, a point in time when transmission is started (for example, the time T12a) is illustrated as a transmitting point in time (for example, T12), and a point in time when reception is completed (for example, the time T11b) is illustrated as a receiving point in time (for example, T11).

Similarly to FIG. 6, also in FIGS. 8, 9, 16, and 17, which are described later, each transmitting point in time indicates a point in time when transmission is started, and each receiving point in time indicates a point in time when reception is completed.

Figure 8:
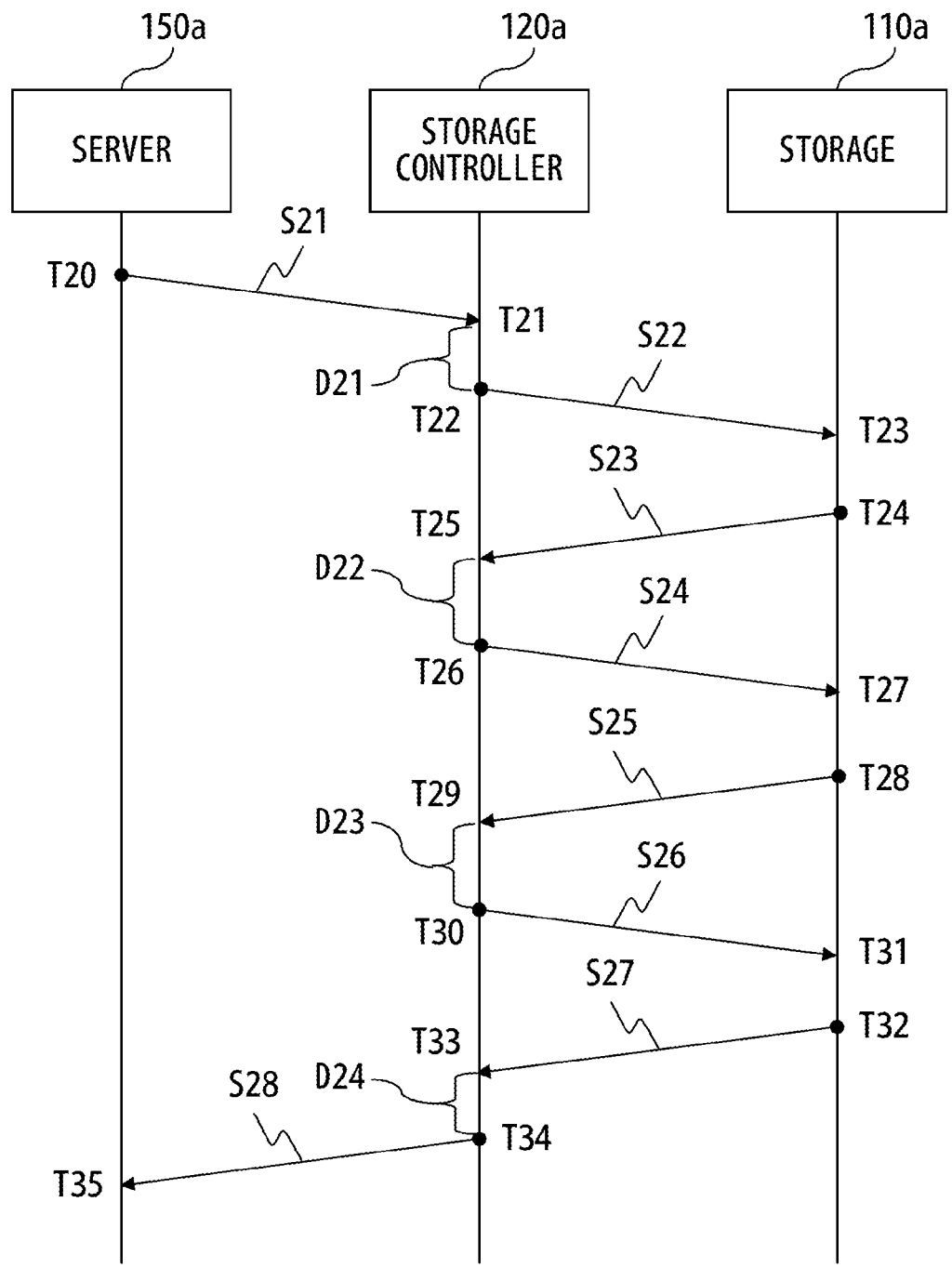
FIG. 8 is a sequence diagram (No. 3) for describing the internal processing time.

FIG. 8 is a sequence diagram illustrating an example different from the example illustrated in FIGS. 6 and 7. Specifically, the sequence diagram of FIG. 8 exemplifies the case as follows.

The server 150a transmits an access request to a certain logical volume managed by the storage controller 120a.

Specifically, the area accessed in response to this access request is included within certain one of the logical units in the storage 110a or spans two or more logical units in the storage 110a.

The access from the storage controller 120a to the above-mentioned certain one of the logical units or the above-mentioned two or more logical units is implemented by three times of access.

For example, the logical volume 122a in FIG. 2 may be fragmented into the three logical units 111a to 113a in the storage 110a and one or more logical units in the storage 110c. Further, an area to which access is requested by a certain access request to the logical volume 122a may happen to span the three logical units 111a to 113a.

For example, in such a case, the storage controller 120a may respectively access the logical units 111a, 112a, and 113a at the first, second, and third times, in response to the reception of the access request from the server 150a. Also in other cases, for some reason, the storage controller 120a may access the storage 110a a plurality of times in response to one access request transmitted from the server 150a.

Described below with reference to FIG. 8 is a specific example of the internal processing time of the storage controller 120a in the access processing that involves a plurality of times of access to the storage 110a.

As illustrated in Step S21, the server 150a transmits an access request to the storage controller 120a at a time T20. Then, the storage controller 120a receives the access request at a time T21.

After that, as illustrated in Step S22, the storage controller 120a transmits a first access command to the storage 110a at a time T22. Then, the storage 110a receives the first access command at a time T23.

The storage 110a accesses a physical storage device in accordance with the received first access command. Then, as illustrated in Step S23, the storage 110a returns a first reply to the storage controller 120a at a time T24. The first reply returned by the storage 110a is received by the storage controller 120a at a time T25.

After that, as illustrated in Step S24, the storage controller 120a transmits a second access command to the storage 110a at a time T26. Then, the storage 110a receives the second access command at a time T27.

The storage 110a accesses a physical storage device in accordance with the received second access command. Then, as illustrated in Step S25, the storage 110a returns a second reply to the storage controller 120a at a time T28. The second reply returned by the storage 110a is received by the storage controller 120a at a time T29.

After that, as illustrated in Step S26, the storage controller 120a transmits a third access command to the storage 110a at a time T30. Then, the storage 110a receives the third access command at a time T31.

The storage 110a accesses a physical storage device in accordance with the received third access command. Then, as illustrated in Step S27, the storage 110a returns a third reply to the storage controller 120a at a time T32. The third reply returned by the storage 110a is received by the storage controller 120a at a time T33.

Lastly, as illustrated in Step S28, the storage controller 120a returns a reply to the access request received in Step S21, to the server 150a at a time T34. Then, the server 150a receives the reply at a time T35.

In the example of FIG. 8 as described above, the internal processing time D of the storage controller 120a is, specifically, the sum of the times D21 to D24 as indicated in Formula (2).

$$D = D21 + D22 + D23 + D24 \quad (2)$$
$$= (T22 - T21) + (T26 - T25) + (T30 - T29) + (T34 - T33)$$

For example, the internal processing time D21 includes: a length of time for which the access request transmitted by the server 150a in Step S21 is being queued in the access request queue 302a; and a length of time for which the access command executing unit 303a generates the access command to be transmitted in Step S22. Further, the internal processing time D22 includes a length of time for which the access command executing unit 303a generates the access command to be transmitted in Step S24, and the internal processing time D23 includes a length of time for which the access command executing unit 303a generates the access command to be transmitted in Step S26.

Meanwhile, the internal processing time D24 includes a length of time for which the access command executing unit 303a generates the single reply to be returned to the server 150a from the three replies received in Steps S23, S25, and S27. In some cases, the access command executing unit 303a may make some preparations for the return of the reply to the server 150a in part of the period from the time T25 to the time T26. Similarly, the access command executing unit 303a may make some preparations for the return of the reply to the server 150a in part of the period from the time T29 to the time T30. Then, the access command executing unit 303a may complete a process of generating the reply to be returned to the server 150a in the period from the time T33 to the time T34.

Figure 9:
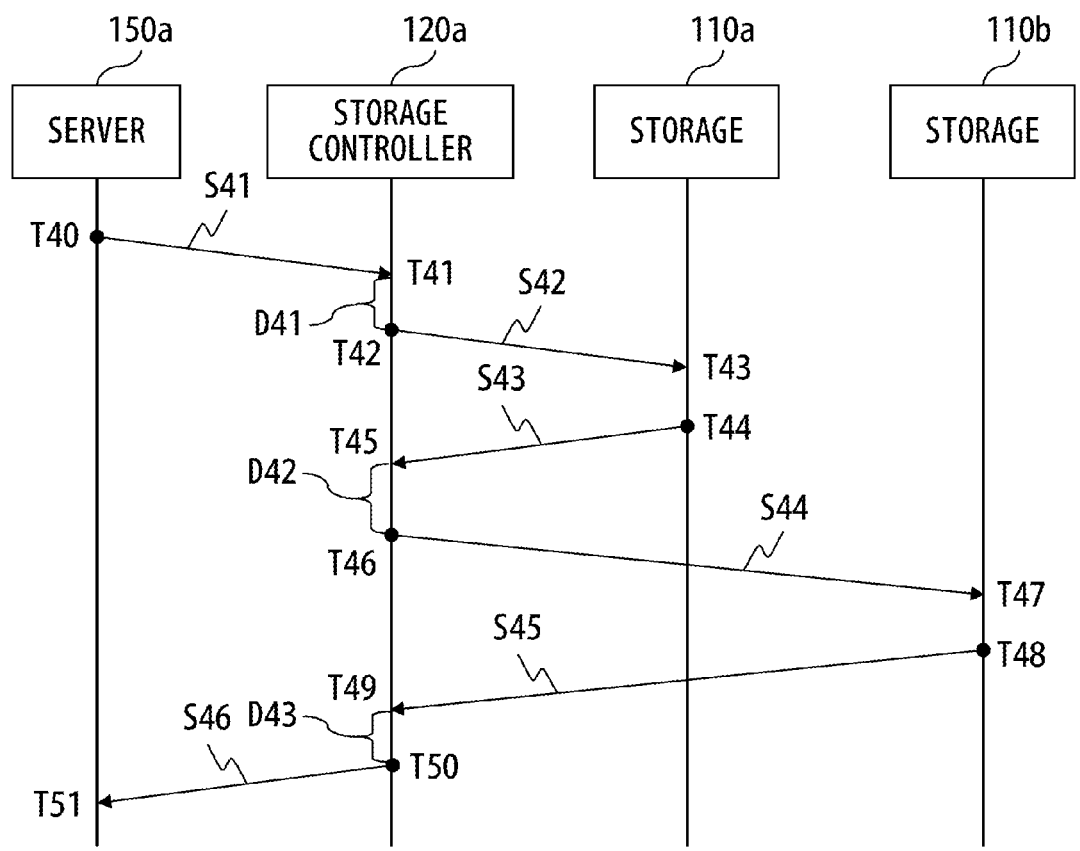
FIG. 9 is a sequence diagram (No. 4) for describing the internal processing time.

In the meantime, the storage controller may access a plurality of storages in response to one access request transmitted by the server 150a. FIG. 9 is a sequence diagram illustrating an example of such a case. Specifically, FIG. 9 exemplifies the case as follows.

The server 150a transmits an access request to a certain logical volume managed by the storage controller 120a.

The area accessed in response to this access request specifically spans a certain logical unit in the storage 110a and a certain logical unit in the storage 110b.

Accordingly, the storage controller 120a accesses both the storages 110a and 110b.

For example, as illustrated in FIG. 3, the areas A to D of the logical volume 121a are located in the logical units 111a, 112a, 111b, and 112b, respectively. Accordingly, if the server 150a issues an access request that involves access to the areas B and C, the storage controller 120a accesses the logical unit 112a, which includes the area B, and the logical unit 111b, which includes the area C. That is, the storage controller 120a accesses both the storages 110a and 110b.

As described above, the storage controller 120a may access a plurality of storages in response to one access request transmitted by the server 150a. Described below with reference to FIG. 9 is a specific example of the internal processing time of the storage controller 120a in the access processing that involves access to a plurality of storages.

As illustrated in Step S41, the server 150a transmits an access request to the storage controller 120a at a time T40. Then, the storage controller 120a receives the access request at a time T41.

After that, as illustrated in Step S42, the storage controller 120a transmits a first access command to the storage 110a at a time T42. Then, the storage 110a receives this access command at a time T43.

The storage 110a accesses a physical storage device in accordance with the received access command. Then, as illustrated in Step S43, the storage 110a returns a reply to the storage controller 120a at a time T44. The reply returned by the storage 110a is received by the storage controller 120a at a time T45.

After that, as illustrated in Step S44, the storage controller 120a transmits a second access command to the storage 110b at a time T46. Then, the storage 110b receives this access command at a time T47.

The storage 110b accesses a physical storage device in accordance with the received access command. Then, as illustrated in Step S45, the storage 110b returns a reply to the storage controller 120a at a time T48. The reply returned by the storage 110b is received by the storage controller 120a at a time T49.

Lastly, as illustrated in Step S46, the storage controller 120a returns a reply to the access request received in Step S41, to the server 150a at a time T50. Then, the server 150a receives the reply at a time T51.

In the example of FIG. 9 as described above, the internal processing time of the storage controller 120a is, specifically, the sum of the times D41 to D43 as indicated in Formula (3).

$$D = D41 + D42 + D43 \quad (3)$$
$$= (T42 - T41) + (T46 - T45) + (T50 - T49)$$

For example, the internal processing time D41 includes: a length of time for which the access request that is transmitted by the server 150a in Step S41 is being queued in the access request queue 302a; and a length of time for which the access command executing unit 303a generates the access command to be transmitted in Step S42. Further, the internal processing time D42 includes a length of time for which the access command executing unit 303a generates the access command to be transmitted in Step S44.

Meanwhile, the internal processing time D43 includes a length of time for which the access command executing unit 303a generates the single reply to be returned to the server 150a from the two replies received in Steps S43 and S45. In some cases, the access command executing unit 303a may make some preparations for the return of the reply to the server 150a in part of the period from the time T45 to the time T46.

As described above with reference to FIGS. 6 to 9, the internal processing time of the storage controller 120a is part of the length of time from a point in time when the storage controller 120a receives an access request to a point in time when the storage controller 120a transmits a reply to the server 150a. The internal processing time may include: a length of time for which the access request is being queued within the storage controller 120a; and/or a length of time taken for the storage controller 120a to generate an access command addressed to the storage 110a. Meanwhile, the internal processing time does not include a waiting time (for example, a length of time from the time T12 to the time T15 in FIG. 6). This is because the waiting time depends on the bandwidth of the network and the hardware performance of the storage(s), and is irrelevant to the hardware performance of the storage controller itself.

Next, the processing performed in the first embodiment and the various pieces of data are described more in detail with reference to FIGS. 10 to 15.

FIG. 10 is a diagram illustrating the various pieces of data. Specifically, FIG. 10 illustrates the time recording table 306a, the primary aggregate tables 311, and the secondary aggregate table 312 in FIG. 5.

As illustrated in FIG. 5, the time recording table 306a is stored in the storage unit 305a of the storage controller 120a. Each entry of the time recording table 306a includes two fields of an "access request number" and an "internal processing time".

The access request number is a specific example of identification information for identifying an access request. The internal processing time indicates a length of time taken for the internal processing performed within the storage controller 120a, of a length of time taken to process the access request identified by the access request number. FIG. 10 indicates, for example, that it took 5,217 microseconds for the internal processing of the access request with No. 1.

The time recording table 306a is cleared every "first predetermined period of time" (for example, every one minute), as described later in detail with reference to FIG. 12. Accordingly, each entry of the time recording table 306a indicates the internal processing time for an access request for which the storage controller 120a has completed processing at any point in the past within the first predetermined period of time up to the present point.

Note that the length of the first predetermined period of time may be arbitrarily determined in accordance with embodiments. For example, in the case where the storage unit 305a, which holds the time recording table 306a, is specifically the RAM 212, it is preferable that the length of the first predetermined period of time be determined in accordance with the capacity of the RAM 212.

The primary aggregate tables 311 are stored in the shared disk 170 as illustrated in FIG. 5. Specifically, the primary aggregate tables 311 include each individual primary aggregate table corresponding to each storage controller in the virtual storage system 100. For example, a primary aggregate table 311a corresponds to the storage controller 120a, and a primary aggregate table 311b corresponds to the storage controller 120b. In FIG. 10, only the primary aggregate table 311a is illustrated in detail.

Each entry of the primary aggregate table 311a includes four fields of a "date", a "time", an "average internal processing time", and the "number of executed access requests". The primary aggregate table 311a is a table for storing a result of aggregating data of the time recording table 306a. Each entry of the primary aggregate table 311a corresponds to one period of time whose length is the length of the first predetermined period of time. That is, each entry of the primary aggregate table 311a corresponds to aggregate calculation that is performed once every first predetermined period of time.

For example, FIG. 10 illustrates an example in which the first predetermined period of time is one minute. Hence, a new entry is recorded into the primary aggregate table 311a every minute.

For example, the date of "Feb. 3, 2011" and the time of "10:00" are recorded in the first entry of the primary aggregate table 311a in FIG. 10. This indicates that the first entry corresponds to a one-minute period that ends at 10:00 and 00 seconds on Feb. 3, 2011. In addition, the average internal processing time of "3,412 microseconds" and the number of executed access requests of "56" are recorded in the first entry. Accordingly, the first entry indicates the following contents.

The number of access requests for which the storage controller 120a has completed processing at any point within the one-minute period from 9:59:00 (not inclusive) to 10:00:00 (inclusive) on Feb. 3, 2011 is 56.

The average of the internal processing times for these 56 access requests in the storage controller 120a is 3,412 microseconds.

Similarly, the second entry indicates the following contents.

The number of access requests for which the storage controller 120a has completed processing at any point within the one-minute period from 10:00:00 (not inclusive) to 10:01:00 (inclusive) on Feb. 3, 2011 is 123.

The average of the internal processing times for these 123 access requests in the storage controller 120a is 6,176 microseconds.

It is similarly apparent from FIG. 10 as to what the third and fourth entries indicate. Note that, as described later in detail with reference to FIG. 12, each entry of the primary aggregate table 311a is valid in only a "second predetermined period of time" (for example, one week).

For example, each entry of the primary aggregate table 311a may be deleted when the second predetermined period of time elapses after this entry is added. Alternatively, the primary aggregate table 311a may be realized by a ring buffer. In this case, for each individual entry of the primary aggregate table 311a, all fields of this entry are rewritten every second predetermined period of time.

As illustrated in FIG. 5, the secondary aggregate table 312 is stored in the shared disk 170. Each entry of the secondary aggregate table 312 includes two fields of a "storage controller number" and an "average internal processing time".

The storage controller number is a specific example of identification information for identifying a storage controller. That is, each entry of the secondary aggregate table 312 corresponds to each storage controller.

The average internal processing time indicates a time per access request that is taken, on average, for the storage controller identified by the storage controller number to perform the internal processing. More specifically, the average internal processing time in the secondary aggregate table 312 indicates the arithmetic mean of internal processing times in the second predetermined period of time (for example, one week). FIG. 10 indicates, for example, that it takes, on average, 8,176 microseconds per access request in the storage controller with No. 1.

For example, assume that the number assigned to the storage controller 120a is 1. In this case, the first entry of the secondary aggregate table 312 corresponds to the storage controller 120a. That is, in this case, the first entry of the secondary aggregate table 312 indicates that a result of aggregating pieces of data in the primary aggregate table 311a, which corresponds to the storage controller 120a, is 8,176 microseconds.

In the first embodiment, specifically, Formula (4) is used to calculate, from one primary aggregate table corresponding to one storage controller, the average internal processing time in the entry corresponding to the one storage controller in the secondary aggregate table 312.

$$avr2(c) = \frac{1}{\sum_{i=1}^{N} \text{num}(c, i)} \sum_{i=1}^{N} (avr1(c, i) \times \text{num}(c, i)) \quad (4)$$

The meaning of each symbol in Formula (4) is as listed below. According to Formula (4), the arithmetic mean of internal processing times in the second predetermined period of time can be calculated using one primary aggregate table.

The letter "c" indicates a storage controller number.

The function "num(c, i)" indicates the number of executed access requests in the i-th entry of the primary aggregate table corresponding to the storage controller with No. c.

The letter "N" indicates the total number of entries of one primary aggregate table. Note that N is a constant independent of c.

The function "avr1(c, i)" indicates the average internal processing time in the i-th entry of the primary aggregate table corresponding to the storage controller with No. c.

The function "avr2(c)" indicates the average internal processing time in the entry corresponding to the storage controller with No. c in the secondary aggregate table 312.

Next, how such data as illustrated in FIG. 10 is obtained is specifically described with reference to FIGS. 11 and 12.

FIG. 11 is a flowchart of the processing that is performed by the storage controller of the first embodiment upon receipt of an access request. Upon receipt of an access request from any server, each storage controller in the virtual storage system 100 starts the processing of FIG. 11.

In the following, for the sake of convenience of description, the processing of FIG. 11 is described by taking, as an example, the case where the storage controller 120a receives an access request from the server 150a (more specifically, from the multi-path driver 151a of the server 150a). The storage controller 120a may execute the processing of FIG. 11 in a separate thread for each access request.

First, the access request receiving unit 301a receives an access request to any of the logical volumes managed by the storage controller 120a, from the multi-path driver 151a of the server 150a via the network 140. Upon completion of the reception of the access request, the processing of FIG. 11 is started.

In Step S101, the control unit 304a starts the measurement of an internal processing time.

For example, a hardware timer built in the CPU 211 may be used for the measurement of the internal processing time. In the example of FIG. 11, however, the control unit 304a measures the internal processing time by using, specifically, a variable T for indicating a measurement start time and a variable D for indicating the internal processing time. That is, in Step S101, the control unit 304a assigns the current time to the variable T, and initializes the variable D to 0. Note that, in FIG. 11, it is assumed that "Now( )" indicates the current time. For example, in the example illustrated in FIGS. 6 and 7, the time T11 (that is, the time T11b) is assigned to the variable T in Step S101.

Subsequently, in Step S102, the access request receiving unit 301a enqueues the received access request into the access request queue 302a. After that, as illustrated in Step S103, the access command executing unit 303a waits until the access request that is enqueued into the access request queue 302a in Step S102 comes to the head of the access request queue 302a.

Then, if the access request that is enqueued into the access request queue 302a in Step S102 comes to the head of the access request queue 302a, the access command executing unit 303a dequeues the access request from the head of the access request queue 302a in Step S104.

Subsequently, in Step S105, the access command executing unit 303a performs appropriate internal processing. For example, in Step S105, the access command executing unit 303a determines to which storage an access command is to be transmitted, and generates the access command to the storage.

If preparations to transmit the access command from the access command executing unit 303a to one of the storages are completed as a result of the internal processing in Step S105, the control unit 304a then updates the variable D in Step S106. That is, the measurement of the internal processing time is once interrupted in Step S106.

Specifically, the control unit 304a subtracts the measurement start time indicated by the variable T from the current time, and adds the subtraction result to the time indicated by the variable D. Then, the control unit 304a newly assigns the addition result to the variable D. In FIG. 11, the update of the variable D in Step S106 is indicated as Formula (5) given below. Note that the equal sign in Formula (5) indicates assignment (i.e., substitution) of a value.

$$D=D+(\text{Now}( )-T) \quad (5)$$

For example, in the example illustrated in FIGS. 6 and 7, the current time Now( ) in Formula (5) is the time T12 (that is, the time T12a). Accordingly, in the example illustrated in FIGS. 6 and 7, the value of the variable D updated in Step S106 is, specifically, D11 (=T12−T11=T12a−T11b).

Subsequently, in Step S107, the access command executing unit 303a transmits the access command generated by the internal processing in Step S105, to the storage via the network 130. After that, as illustrated in Step S108, the access command executing unit 303a waits for the reception of a reply from the storage.

Then, upon completion of the reception of the reply from the storage, the control unit 304a restarts the measurement of the internal processing time in Step S109. Specifically, the control unit 304a assigns the current time to the variable T. For example, in the example illustrated in FIGS. 6 and 7, the time T15 (that is, the time T15b) is assigned to the variable T in Step S109.

In the meantime, as described above with reference to FIGS. 8 and 9, the storage controller 120a may transmit two or more access commands in response to one access request from the server 150a. Hence, in Step S110, the control unit 304a judges whether or not there is still an access command to be transmitted to any storage, through an inquiry to the access command executing unit 303a.

If there is no more access command to be transmitted to any storage, the processing of FIG. 11 proceeds to Step S111. Conversely, if there is still an access command to be transmitted to any storage, the processing of FIG. 11 returns to Step S105. Note that, in the case where the processing returns from Step S110 to Step S105, the internal processing performed in Step S105 may include some processing for preparing a reply from the storage controller 120a to the server 150a.

For example, in the example illustrated in FIGS. 6 and 7, the processing proceeds from Step S110 to Step S111 when Step S110 is first executed. In comparison, in the example of FIG. 8, the processing returns from Step S110 to Step S105. More specifically, in the example of FIG. 8, Steps S105 to S110 are repeated three times. Further, in the example of FIG. 9, Steps S105 to S110 are repeated two times.

For example, in the example of FIG. 8, the control unit 304a repeats the update of the variable T and the variable D in the following manner.

At the time T21, T=T21 and D=0 according to Step S101.

At the time T22, D=D21 (=0+(T22−T21)) according to Step S106.

At the time T25, T=t25 according to Step S109.

At the time T26, D=D21+D22 (=D21+(T26−T25)) according to Step S106.

At the time T29, T=t29 according to Step S109.

At the time T30, D=D21+D22+D23 (=D21+D22+(T30−T29)) according to Step S106.

At the time T33, T=t33 according to Step S109.

Further, in the example of FIG. 9, the control unit 304a repeats the update of the variable T and the variable D in the following manner.

At the time T41, T=T41 and D=0 according to Step S101.

At the time T42, D=D41 (=0+(T42−T41)) according to Step S106.

At the time T45, T=t45 according to Step S109.

At the time T46, D=D41+D42 (=D41+(T46−T45)) according to Step S106.

At the time T49, T=t49 according to Step S109.

Step S111 is executed as described above when the access command executing unit 303a completes the transmission of all of the one or more access commands to an appropriate storage (s), and completes the reception of a reply to the last transmitted access command. In Step S111, the access command executing unit 303a executes internal processing for returning a reply to the server 150a. For example, the access command executing unit 303a may generate a reply to be returned to the server 150a, from each of one or more replies obtained from one or more storages as described above, and may output the generated reply to the access request receiving unit 301a.

If preparations to return the reply to the server 150a are completed as a result of the internal processing in Step S111, the control unit 304a then updates the variable D in Step S112. That is, the measurement of the internal processing time is ended in Step S112. Specifically, the control unit 304a updates the variable D in a manner similar to that in Step S106.

For example, in the example illustrated in FIGS. 6 and 7, because Step S112 is executed at the time T16 (that is, the time T16a), the value of the variable D is updated from D11 to (D11+D12) in Step S112. Further, in the example of FIG. 8, because Step S112 is executed at the time T34, the value of the variable D is updated from (D21+D22+D23) to (D21+D22+D23+D24) in Step S112. In addition, in the example of FIG. 9, because Step S112 is executed at the time T50, the value of the variable D is updated from (D41+D42) to (D41+D42+D43) in Step S112.

Subsequently, in Step S113, the access request receiving unit 301a returns the reply to the server 150a via the network 140.

Lastly, in Step S114, the control unit 304a writes the value of the variable D into the time recording table 306a. More specifically, the control unit 304a adds a new entry including the following two values, to the time recording table 306a.

access request number included in the access request that has been transmitted from the server 150a and has triggered the processing of FIG. 11

Value of the variable D

As is apparent from the above description of FIG. 11, one entry is added to the time recording table 306a each time the storage controller 120a processes one access request from any server. In addition, the internal processing time included in the entire length of time taken to process the one access request is recorded in the added entry.

The thus obtained data of the time recording table 306a is aggregated in two stages, whereby the time information (that is, the average internal processing time in the secondary aggregate table 312) to be used in Step S2 in FIG. 1 is obtained. Hereinafter, calculation and recording of the average internal processing time are specifically described with reference to FIG. 12.

Figure 12:
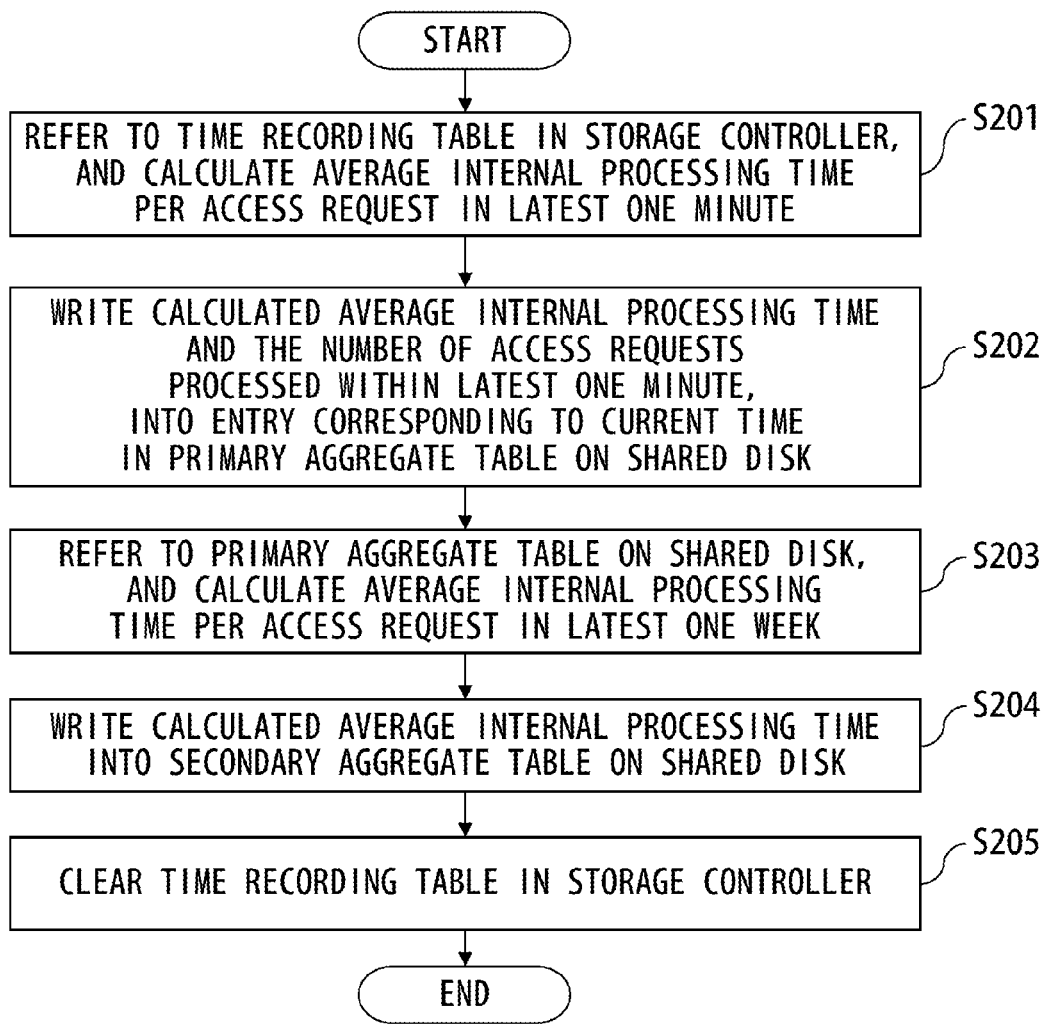
FIG. 12 is a flowchart of the processing that is periodically performed by the storage controller.

FIG. 12 is a flowchart of the processing that is periodically (i.e., regularly) performed by the storage controller. Each storage controller in the virtual storage system 100 periodically executes the processing of FIG. 12. More specifically, the control unit in each storage controller executes the processing of FIG. 12 every first predetermined period of time, which is described above with reference to FIG. 10. In the following, for the sake of convenience of description, it is assumed that the first predetermined period of time is one minute and that the second predetermined period of time is one week. FIG. 12 is described below by taking, as an example, the case where the control unit 304a of the storage controller 120a executes the processing of FIG. 12.

In Step S201, the control unit 304a refers to the time recording table 306a in the storage controller 120a, and calculates the average internal processing time per access request in the latest one minute in the storage controller 120a. In the first embodiment, the time recording table 306a records therein only the internal processing times for access requests for which the storage controller 120a has completed processing at any point in time included within the latest one minute. Accordingly, in Step S201, specifically, the control unit 304a divides the sum of the internal processing times of all the entries of the time recording table 306a by the number of entries of the time recording table 306a, to thereby calculate the average internal processing time.

Subsequently, in Step S202, the control unit 304a updates the primary aggregate table 311a, which corresponds to the storage controller 120a, in the primary aggregate tables 311 on the shared disk 170. Specifically, the control unit 304a writes the average internal processing time calculated in Step S201 and the number of access requests that are processed by the storage controller 120a within the latest one minute, into an entry corresponding to the current time in the primary aggregate table 311a.

For example, the control unit 304a may delete an entry in which the values of the fields "date" and "time" indicate the date and time just one week before the present, from the primary aggregate table 311a, and may add a new entry instead. In this case, the "entry corresponding to the current time" described above is the added new entry.

Alternatively, the primary aggregate table 311a may be realized by a ring buffer. In this case, the "entry corresponding to the current time" described above is an entry in which the values of the fields "date" and "time" indicate the date and time just one week before the present. For example, in the case where the current time is 10:00 and 00 seconds on Feb. 10, 2011, the "entry corresponding to the current time" is the first entry illustrated in FIG. 10.

In any case, the control unit 304a sets the values to the fields in the entry corresponding to the current time as follows.

The control unit 304a writes the date of today into the field of the "date".

The control unit 304a writes the current time into the field of the "time".

The control unit 304a writes the average internal processing time calculated in Step S201 into the field of the "average internal processing time".

The control unit 304a writes the total number of the entries of the time recording table 306a (that is, the number of access requests processed by the storage controller 120a within the latest one minute) into the field of the "number of executed access requests".

Moreover, in Step S203, the control unit 304a refers to the thus updated primary aggregate table 311a on the shared disk 170, and calculates the average internal processing time per access request in the latest one week in the storage controller 120a. Specifically, the control unit 304a calculates the average internal processing time according to Formula (4), which has been described above with reference to FIG. 10.

Then, in Step S204, the control unit 304a writes the average internal processing time calculated in Step S203, into the entry corresponding to the storage controller 120a, in the secondary aggregate table 312 on the shared disk 170.

Further, in Step S205, the control unit 304a clears the time recording table 306a in the storage controller 120a. That is, the control unit 304a deletes all the entries of the time recording table 306a. Then, the processing of FIG. 12 terminates.

Next, effects produced by the processing of FIG. 12 are described.

The time recording table 306a is frequently accessed by the control unit 304a. That is, the time recording table 306a is accessed each time the storage controller 120a completes processing of an access request, and is also accessed every first predetermined period of time. It is desirable that the time recording table 306a, which is thus frequently accessed by the control unit 304a, be stored in the RAM 212 of the storage controller 120a.

Note that the time recording table 306a may be stored in the non-volatile storage device 213 of the storage controller 120a. In any case, it is desirable that the time recording table 306a be stored locally in the storage controller 120a, not in a storage device (for example, the shared disk 170) outside of the storage controller 120a.

Meanwhile, the capacity of the RAM 212 of the storage controller 120a is smaller than, for example, that of a RAM of the server 150a in many cases. Similarly, the capacity of the non-volatile storage device 213 of the storage controller 120a is smaller than, for example, those of the physical HDD 201 and the shared disk 170 in many cases. Accordingly, it is desirable that the storage capacity that is consumed for the time recording table 306a by the storage controller 120a be small.

Here, according to the processing of FIG. 12, the storage capacity that the storage controller 120a consumes for the time recording table 306a is relatively small because this storage capacity is a capacity according to the first predetermined period of time (for example, one minute), which is relatively short. That is, the processing of FIG. 12 produces an advantageous effect that a relatively small storage capacity is sufficient for the time recording table 306a. Similarly, the processing of FIG. 12 produces an advantageous effect that the storage capacity that the storage controller 120b consumes for the time recording table 306b is also relatively small.

Meanwhile, the frequency with which an individual primary aggregate table is accessed is much lower than the frequency with which an individual time recording table is accessed. Similarly, the frequency with which the secondary aggregate table 312 is accessed is much lower than the frequencies with which individual time recording tables are accessed. Accordingly, it does not matter if the primary aggregate tables 311 and the secondary aggregate table 312 are stored in the shared disk 170 outside of the storage controllers as illustrated in FIG. 5.

Further, the capacity of the shared disk 170 is much larger than, for example, that of the RAM 212 of the storage controller 120a. Accordingly, it does not matter if data that consumes a relatively large storage capacity is stored in the shared disk 170. Specifically, it does not matter if the capacity of the primary aggregate tables 311 stored in the shared disk 170 is large.

Although the lengths of the first and second predetermined periods of time may be determined depending on embodiments, the second predetermined period of time is longer than the first predetermined period of time anyway. For example, in the above-mentioned example, the second predetermined period of time is one week, and the first predetermined period of time is one minute. Hence, the second predetermined period of time is sufficiently longer than the first predetermined period of time.

In addition, as understood from the description of FIGS. 10 and 12, the storage capacity of each primary aggregate table is a capacity according to the ratio of the second predetermined period of time to the first predetermined period of time. Accordingly, in the case where the second predetermined period of time is sufficiently longer than the first predetermined period of time, the storage capacity of each primary aggregate table is relatively large. Further, the storage capacity for the primary aggregate tables 311 becomes larger in accordance with the total number of storage controllers.

Fortunately, it does not matter even if the primary aggregate tables 311 consume a relatively large storage capacity. This is because the capacity of the shared disk 170 is relatively large as described above. Further, if the second predetermined period of time is sufficiently long, an advantageous effect is produced.

This is because the reliability of the time information is increased and the appropriateness of the selection in Step S2 is enhanced by using, as the time information in Step S2 in FIG. 1, the average internal processing time in the second predetermined period of time that is somewhat long. For example, the average internal processing time in such a short period as one minute is easily influenced by incidental factors. In contrast, for example, the average internal processing time in such a relatively long period as one week is less easily influenced by incidental factors, and hence the reliability thereof is high. Hence, in the first embodiment, in which the average internal processing time in the second predetermined period of time is used as the time information in Step S2 in FIG. 1, an appropriate storage controller is highly likely to be selected.

That is, the following effects are produced by performing aggregation calculation in two stages as illustrated in FIG. 12 (specifically, by performing aggregation calculation for obtaining the average internal processing time in the first predetermined period of time and aggregation calculation for obtaining the average internal processing time in the second predetermined period of time).

Data of the secondary aggregate table 312 is obtained as the time information having a high reliability (in other words, as the time information which is less easily influenced by incidental factors). Hence, an appropriate storage controller is selected in Step S2 in FIG. 1 according to the time information having a high reliability.

Even if the storage capacity in each storage controller is relatively small, the time information having a high reliability is obtained.

The average internal processing time recorded in the secondary aggregate table 312 is recalculated and updated every first predetermined period of time that is relatively short. Hence, the time information used in Step S2 has not only a high reliability but also an excellent ability to follow a change in situation. In other words, the ability to follow a change in situation is excellent because what is usable is the average internal processing time in the "latest" one week, not outdated information such as the average internal processing time in one week from 12 days to 5 days before the present, for example.

Further, in the first embodiment, in order to obtain the average internal processing time of each storage controller, it is not necessary to cause each storage controller to process test access requests. Accordingly, compared with a system in which the performance of devices therein is measured by using test data, the first embodiment is advantageous in that the average internal processing time as a value indicating the performance of each storage controller is obtained without any additional load resulting from test access requests.

Further, in the first embodiment, the time information is obtained not from the internal processing times of a limited number of test access requests but from the internal processing times of a large number of access requests processed over the relatively long second predetermined period of time (for example, one week). Accordingly, compared with a system in which the performance of devices therein is measured by using test data, the first embodiment is advantageous also in that the obtained time information is less easily influenced by incidental factors, and has a high reliability.

Next, a specific example of the addition of a new logical volume is described in detail with reference to FIGS. 13 to 15. As the outline is given in FIG. 1, when the new logical volume is going to be added, an active storage controller for the new logical volume is selected according to the time information (specifically, the secondary aggregate table 312 obtained through the above-mentioned processing of FIGS. 11 and 12).

Figure 13:
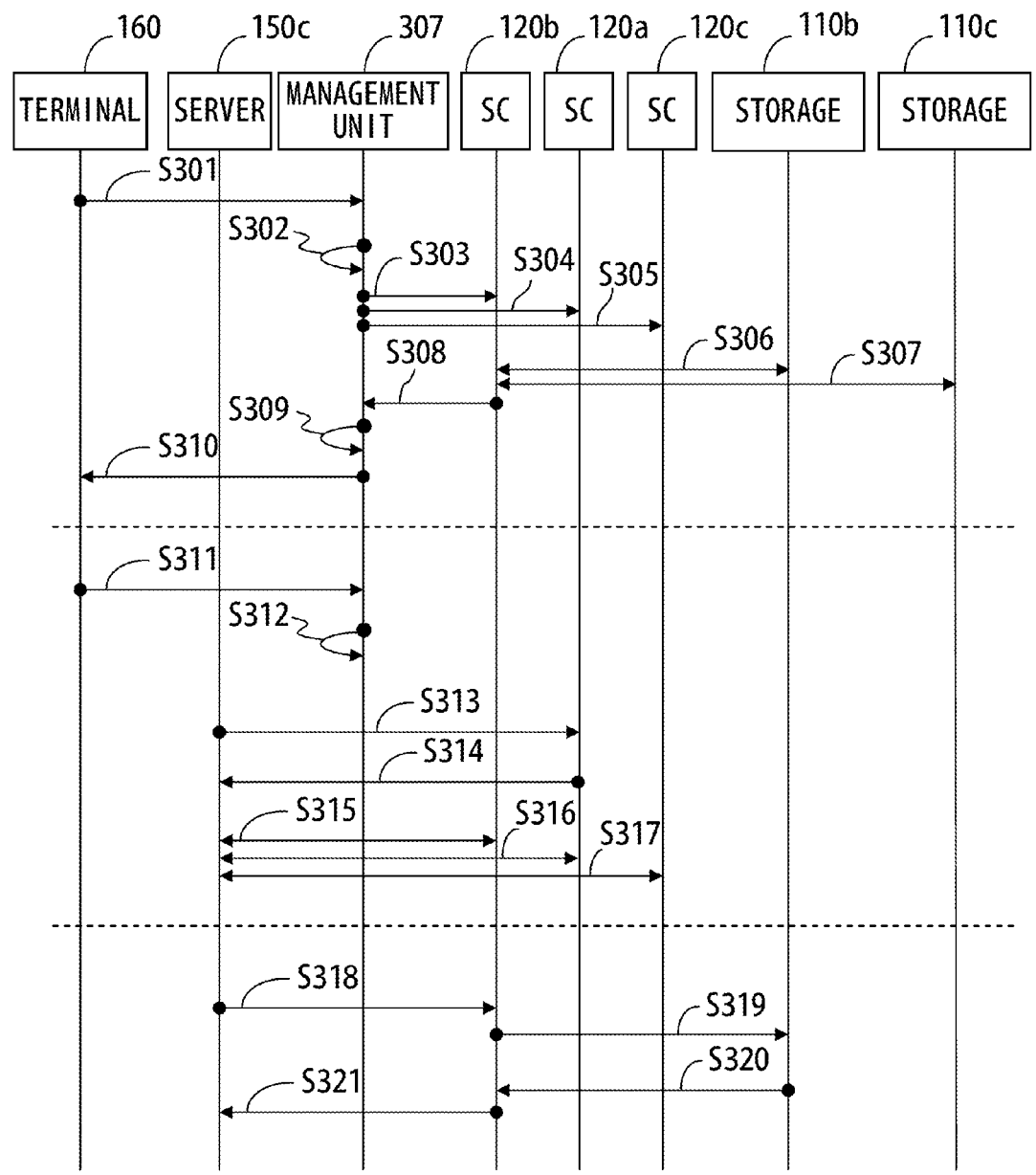
FIG. 13 is a sequence diagram illustrating the addition of a new logical volume.

FIG. 13 is a sequence diagram illustrating the addition of the new logical volume. Further, FIGS. 14 and 15 are diagrams illustrating examples of various pieces of data used in the operation sequence of FIG. 13. Note that the term "storage controller" is abbreviated as "SC" in FIG. 13 due to space limitations.

In Step S301, the terminal 160 receives an input of an instruction to create the new logical volume, from the user. This instruction includes a logical volume identification (ID) that is identification information for identifying the new logical volume. For the sake of convenience of description, it is assumed that a logical volume ID of "VOL_5" is specified in Step S301.

In accordance with the input from the user, the terminal 160 transmits a creation request for the new logical volume to the management unit 307 via the network 140. The creation request includes the above-mentioned logical volume ID of "VOL_5". The creation request further includes one or more other parameters such as the capacity of the logical volume.

Then, the management unit 307 (more specifically, the creation request receiving unit 308 in the management unit 307) receives the creation request. The reception of the creation request in Step S301 corresponds to Step S1 in FIG. 1.

Subsequently, in Step S302, the management unit 307 (more specifically, the selection unit 309 in the management unit 307) selects one active storage controller to take charge of the new logical volume and one or more stand-by storage controllers for the new logical volume. The selection of the active storage controller in Step S302 corresponds to Step S2 in FIG. 1.

Specifically, the selection unit 309 refers to the secondary aggregate table 312 on the shared disk 170 via the network 130. Then, the selection unit 309 selects, as the active storage controller, one storage controller whose average internal processing time is relatively shorter, from among the plurality of storage controllers included in the virtual storage system 100. It is desirable that the selection unit 309 select, as the active storage controller, the storage controller whose average internal processing time is the shortest.

In this way, in the first embodiment, the average internal processing times stored in the secondary aggregate table 312 are used as pieces of the time information in Step S2 in FIG. 1. That is, the time information in the first embodiment is a statistic (specifically, the arithmetic mean) calculated from the internal processing times corresponding to a plurality of access requests having been issued within a certain period of time in the past (more specifically, within a past period having the length of the second predetermined period of time).

For the sake of convenience of description, it is assumed that the average internal processing time of the storage controller 120b is, in Step S302, found to be the shortest of the average internal processing times of the storage controllers in the virtual storage system 100. Accordingly, in Step S302, the selection unit 309 selects the storage controller 120b as the active storage controller for managing the new logical volume.

In the meantime, the selection of the stand-by storage controller(s) in Step S302 may be random selection, or may be selection based on the average internal processing times stored in the secondary aggregate table 312. Further, the number of the stand-by storage controllers selected by the selection unit 309 may be arbitrarily determined.

For example, the selection unit 309 may refer to the secondary aggregate table 312 and select the storage controllers whose average internal processing times are the second shortest and the third shortest, as two stand-by storage controllers for the new logical volume. The selection unit 309 may randomly select two stand-by storage controllers from among the other storage controllers than the active storage controller. As a matter of course, the number of the stand-by storage controllers may be one, or may be three or more.

In the following, for the sake of convenience of description, it is assumed as follows.

A storage controller number of "1" is assigned to the storage controller 120a.

A storage controller number of "2" is assigned to the storage controller 120b.

A storage controller number of "3" is assigned to the storage controller 120c.

FIGS. 2 and 3 each illustrate only three storage controllers, and FIG. 5 illustrates only two storage controllers, due to space limitations, but the virtual storage system 100 includes at least four storage controllers.

A storage controller number "4" is assigned to a certain storage controller which is not illustrated in the drawings.

As described above, in Step S302, the selection unit 309 selects the storage controller 120b as the active storage controller.

In Step S302, the selection unit 309 selects the storage controllers 120a and 120c as the stand-by storage controllers.

Upon selection of the storage controller 120b as the active storage controller as described above, in Step S303, the selection unit 309 instructs the storage controller 120b to create the new logical volume. Specifically, the selection unit 309 transmits an instruction including parameters such as the logical volume ID of "VOL_5" for the new logical volume and the capacity of the logical volume, to the storage controller 120*b* via the network 130.

Further, in Step S304, the selection unit 309 sends a notification to the storage controller 120*a* selected as the stand-by storage controller. The notification indicates that the storage controller 120*a* is selected as the stand-by storage controller for the new logical volume identified by the logical volume ID of "VOL_5". Note that, because the selection unit 309 itself is included in the storage controller 120*a*, the notification in Step S304 may be realized by, specifically, inter-process communication between the selection unit 309 and the control unit 304*a* in the storage controller 120*a*.

Further, in Step S305, the selection unit 309 sends a notification to the storage controller 120*c* selected as the stand-by storage controller, via the network 130. The notification indicates that the storage controller 120*c* is selected as the stand-by storage controller for the new logical volume identified by the logical volume ID of "VOL_5".

Note that it does not matter if the execution order of Steps S303 to S305 is arbitrarily changed. Further, the instruction in Step S303 is received by the control unit 304*b* of the storage controller 120*b*. In addition, the notification in Step S304 is received by the control unit 304*a* of the storage controller 120*a*, and the notification in Step S305 is received by the control unit (not illustrated) of the storage controller 120*c*.

In the storage controller 120*b*, which has received the instruction in Step S303, the control unit 304*b* builds the new logical volume according to the instruction. Specifically, according to an appropriate policy, the control unit 304*b* first determines how many and which logical units the new logical volume is to be fragmented into. Then, in accordance with the determination, the control unit 304*b* communicates with one or more storages via the network 130, and writes correspondence information for associating the new logical volume with two or more logical units, into the shared disk 170.

For the sake of convenience of description, it is assumed, for example, that the control unit 304*b* determines to fragment the new logical volume into the following four logical units.

Logical units 112*b* and 113*b* in the storage 110*b*
Logical units 111*c* and 112*c* in the storage 110*c*

In this case, in Step S306, the control unit 304*b* communicates with the storage 110*b*, and requests the storage 110*b* to allocate storage areas for the new logical volume in the logical units 112*b* and 113*b*, respectively. If the allocation of the storage areas succeeds, the storage 110*b* returns a notification indicating the success to the control unit 304*b*.

Similarly, in Step S307, the control unit 304*b* communicates with the storage 110*c*, and requests the storage 110*c* to allocate storage areas for the new logical volume in the logical units 111*c* and 112*c*, respectively. If the allocation of the storage areas succeeds, the storage 110*c* returns a notification indicating the success to the control unit 304*b*.

The execution order of Step S306 and Step S307 may be opposite. In any case, as a result of Steps S306 and S307, the new logical volume is built.

Further, as described above, the control unit 304*b* writes, into the shared disk 170, the correspondence information for associating the new logical volume and the logical units with each other. For example, in the case where the new logical volume is fragmented into the logical units 112*b*, 113*b*, 111*c*, and 112*c* as described above, the control unit 304*b* writes, into the shared disk 170, the correspondence information for associating these four logical units with the new logical volume.

Then, upon completion of the creation of the new logical volume in such a manner as described above, in Step S308, the control unit 304*b* notifies the management unit 307 of the completion of the creation of the new logical volume.

Note that, in the example of FIG. 13, the storage controller 120*b*, which is different from the storage controller 120*a* including the management unit 307, is selected as the active storage controller. Hence, communication between the management unit 307 and the control unit 304*b* is performed via the network 130. In the case where the selection unit 309 selects the storage controller 120*a* as the active storage controller, communication between the management unit 307 and the control unit 304*a* may be communication (for example, inter-process communication) within the storage controller 120*a*.

Upon receipt of the completion notification in Step S308, the management unit 307 performs, in Step S309, appropriate processing according to the addition of the new logical volume. For example, in the first embodiment, the management unit 307 updates the storage controller management table 313 and the logical volume management table 314 stored on the shared disk 170.

FIG. 14 illustrates the storage controller management table 313 and the logical volume management table 314. Each entry of the storage controller management table 313 corresponds to one storage controller, and includes the following four fields.

"Storage controller number" field for identifying each storage controller

"State of storage controller" field indicating whether or not the storage controller identified by the storage controller number is normal "IP address" field indicating an Internet Protocol (IP) address assigned to the storage controller identified by the storage controller number "Logical volume ID" field indicating one or more logical volumes for which the storage controller identified by the storage controller number is responsible as an active storage controller For example, the storage controller management table 313 illustrated in FIG. 14 indicates the following contents.

The storage controller 120*a*, to which the storage controller number of "1" is assigned, is normal. An IP address of "10.20.40.50" is assigned to the storage controller 120*a*. Further, the storage controller 120*a* is currently in charge of (i.e., responsible for) a logical volume identified by a logical volume ID of "VOL_1" and a logical volume identified by a logical volume ID of "VOL_4".

The storage controller 120*b*, to which the storage controller number of "2" is assigned, is also normal. An IP address of "10.20.40.51" is assigned to the storage controller 120*b*. Further, the storage controller 120*b* is currently in charge of a logical volume identified by a logical volume ID of "VOL_2" and the logical volume identified by the logical volume ID of "VOL_5".

The storage controller 120*c*, to which the storage controller number of "3" is assigned, is also normal. An IP address of "10.20.40.52" is assigned to the storage controller 120*c*. Further, the storage controller 120*c* is currently in charge of a logical volume identified by a logical volume ID of "VOL_3".

An error occurs in the storage controller (not illustrated) to which the storage controller number of "4" is assigned, and therefore, this storage controller is not normal. Hence, this storage controller is currently in charge of no logical volume, as an active storage controller. An IP address of "10.20.40.53" is assigned to this storage controller.

Each time a new storage controller is added to the virtual storage system 100, the management unit 307 adds one entry to the storage controller management table 313.

Further, if it is detected that the state of a storage controller has changed from a normal state to an abnormal state, the "state of storage controller" field is rewritten. For example, a storage controller that has newly become an active storage controller upon occurrence of failover concerning a certain logical volume may notify the management unit 307 of the occurrence of the failover. The management unit 307 may update the value of the "state of storage controller" field concerning the storage controller in which an error has occurred, on the basis of the notification from the new active storage controller.

In Step S309 in FIG. 13, the storage controller management table 313 is updated, specifically, in the following manner. The management unit 307 adds the logical volume ID of the new logical volume specified in Step S301, to the "logical volume ID" field in the entry for the active storage controller selected in Step S302.

For example, in the example of FIG. 13, the logical volume ID of the new logical volume is "VOL_5", and the storage controller 120b, which has the storage controller number of "2", is selected as the active storage controller in Step S302. Accordingly, in Step S309, the management unit 307 adds the logical volume ID of "VOL_5" to the "logical volume ID" field in the entry whose storage controller number is "2" in the storage controller management table 313. FIG. 14 illustrates the storage controller management table 313 thus updated.

Further, as described above, the logical volume management table 314 is also updated in Step S309. In the logical volume management table 314 illustrated in FIG. 14, each entry corresponds to one logical volume, and includes the following five fields.

"Logical volume IQN" field indicating an iSCSI qualified name (IQN) assigned to each logical volume "Logical volume ID" field for identifying the logical volume to which the logical volume IQN is assigned "State of logical volume" field indicating whether or not the logical volume identified by the logical volume ID is in a normal state "Active storage controller number" field indicating a number for identifying the active storage controller that manages the logical volume identified by the logical volume ID "Stand-by storage controller number" field indicating the list of number(s) for identifying one or more storage controllers selected as the stand-by storage controller(s) for the logical volume identified by the logical volume ID Note that, in the first embodiment, the iSCSI protocol is used, and hence an IQN is assigned to each logical volume. Meanwhile, in the first embodiment, a logical volume ID is also used for the sake of user's convenience. Alternatively, because both the IQN and the logical volume ID are identification information, the logical volume ID may be omitted depending on embodiments. Further, in the case where a protocol (for example, the Fibre Channel protocol) other than the iSCSI is used, identification information suited to the used protocol is used instead of the IQN.

Each time a new logical volume is added, the management unit 307 adds one entry to the logical volume management table 314. For example, in the example of FIG. 13, the logical volume having the logical volume ID of "VOL_5" is added. Accordingly, in response to the addition of this logical volume, the management unit 307 adds, in Step S309, the fifth entry illustrated in FIG. 14, to the logical volume management table 314.

According to the fifth entry, the IQN of the new logical volume is "IQN-TGT55555", the logical volume ID of the new logical volume is "VOL_5", and the state of the new logical volume is normal.

Further, as described above, the selection unit 309 in the management unit 307 selects the storage controller 120b as the active storage controller in Step S302. Accordingly, the management unit 307 writes "2", which is the number assigned to the storage controller 120b, into the "active storage controller number" field.

In addition, as described above, the selection unit 309 selects the storage controllers 120a and 120c as the stand-by storage controllers in Step S302. Accordingly, the management unit 307 writes "1" and "3", which are the numbers respectively assigned to the storage controllers 120a and 120c, into the "stand-by storage controller number" field.

FIG. 14 illustrates the fifth entry that is set in Step S309 in such a manner as described above. Further, the meanings of the first, third, and fourth entries are apparent from FIG. 14.

Note that a value of "DELETING" is stored in the "state of logical volume" field in the second entry. This indicates that failover with regard to the logical volume identified by the logical volume ID of "VOL_2" is currently in progress and that this logical volume is not in a normal state.

A specific technique for failover of storage controllers may be, for example, a known technique. In the first embodiment, the second entry may be rewritten by the management unit 307, for example, in the following manner along with the progress of the failover process. The management unit 307 may recognize the progress of the failover process by communicating with the new active storage controller.

In response to a failure of the storage controller which is identified by the number of "4" and has served as the active storage controller so far, the failover to the storage controller 120a, which is identified by the number of "1" written in the "stand-by storage controller number" field, occurs. For example, in the first embodiment, the value of "DELETING" is rewritten to a value of "CREATING" along with the progress of the failover process. The value of "DELETING" indicates that the association between the above-mentioned storage controller, which is identified by the number of "4" and has served as the active storage controller so far, and the logical volume identified by the logical volume ID of "VOL_2" is being invalidated (i.e., cancelled). The value of "CREATING" indicates that the storage controller 120a is currently in transition from a stand-by state to an active state.

Further, along with the progress of the failover process, the "active storage controller number" field is rewritten from "4" to "1", and the number of "1" is deleted from the "stand-by storage controller number" field. Moreover, another stand-by storage controller is newly selected, and the number assigned to the selected storage controller is added to the "stand-by storage controller number" field.

Note that the process of updating the storage controller management table 313 and the logical volume management table 314 in Step S309, which is described above with reference to FIG. 14, may be modified as appropriate depending on embodiments. In addition, the structures of the storage controller management table 313 and the logical volume management table 314 may also be modified as appropriate depending on embodiments.

In any case, the new logical volume is created as a result of executing Steps S301 to S309 described above. Consequently, in Step S310, the management unit 307 (more specifically, the creation request receiving unit 308 in the management unit 307) notifies the terminal 160 of the completion of the creation of the new logical volume, via the network 140. The notification in Step S310 is a reply to the creation request in Step S301.

Subsequent Steps S311 to S317 indicate an example of the procedure for enabling a server to access the logical volume. Specifically, first in Step S311, the terminal 160 receives, from the user, an input of an instruction to assign the created new logical volume to a server. The instruction includes the logical volume ID of the new logical volume and identification information for identifying the server. In the following, for the sake of convenience of description, it is assumed as follows.

A server 150c (not illustrated in FIGS. 2 and 3) is further connected to the network 140.

The server ID as identification information for identifying the server 150c is "SRV_3".

In Step S311, the terminal 160 receives, from the user, an input of an instruction to assign the new logical volume created as a result of Steps S301 to S310 to the server 150c.

In response to the input from the user, the terminal 160 requests the management unit 307 to assign the new logical volume identified by the logical volume ID of "VOL_5" to the server 150c identified by the server ID of "SRV_3". This request is transmitted via the network 140 as indicated by the arrow of Step S311.

Then, in Step S312, the management unit 307 updates the server management table 315 on the shared disk 170 in response to the received request. For example, in the first embodiment, the server management table 315 as illustrated in FIG. 15 is used.

As illustrated in FIG. 15, each entry of the server management table 315 corresponds to each server that is connected to the virtual storage system 100 via the network 140. Each entry of the server management table 315 includes the following three fields.

"Server ID" field for identifying each server

"Server IQN" field indicating an IQN assigned to the server identified by the server ID "Logical volume ID" field indicating the list of the ID(s) of the logical volume(s) assigned to the server identified by the server ID (that is, the list of the ID(s) of the logical volume(s) accessible from the server identified by the server ID)

Similarly to the logical volume management table 314, also in the server management table 315, an ID is used in addition to an IQN, for the sake of user's convenience. Further, in the case where a protocol (for example, the Fibre Channel protocol) other than the iSCSI is used, identification information suited to the used protocol is used instead of the IQN.

For example, in the example of FIG. 15, as illustrated in the first entry of the server management table 315, an IQN of "IQN1111111" is assigned to a server identified by a server ID of "SRV_1". The two logical volumes respectively identified by the IDs of "VOL_1" and "VOL_2" are assigned to this server.

Further, in the example of FIG. 15, as illustrated in the second entry of the server management table 315, an IQN of "IQN2222222" is assigned to a server identified by a server ID of "SRV_2". The two logical volumes respectively identified by the IDs of "VOL_3" and "VOL_4" are assigned to this server.

Moreover, in the example of FIG. 15, as illustrated in the third entry of the server management table 315, an IQN of "IQN3333333" is assigned to a server identified by a server ID of "SRV_3". In Step S312 in FIG. 13, the management unit 307 adds the ID of "VOL_5" to the "logical volume ID" field of the third entry, in response to the request in Step S311.

Subsequently, in Step S313, the server 150c (more specifically, a multi-path driver (not illustrated) in the server 150c) transmits a "search request" to any of the storage controllers in the virtual storage system 100 in response to an input from the user. The search request is a request for searching for a logical volume(s) accessible from the server 150c (that is, a logical volume(s) assigned to the server 150c). In other words, the search request is a request for searching for a logical volume(s) as an iSCSI target(s) usable from the server 150c as an iSCSI initiator.

The search request may be transmitted to any storage controller. In the following, for the sake of convenience of description, it is assumed that the server 150c selects the storage controller 120a as the destination of the search request according to a certain policy. For example, the server 150c may select the destination of the search request in a round-robin fashion, may randomly select the destination of the search request, or may select a particular predetermined storage controller as the destination of the search request.

Specifically, in Step S313, the server 150c specifies the IP address of the selected storage controller 120a as the destination, and transmits the search request thereto via the network 140. Consequently, the access request receiving unit 301a of the storage controller 120a receives the search request.

Then, in Step S314, the access request receiving unit 301a refers to the shared disk 170 via the network 130, and generates such volume information 316 as illustrated in FIG. 15.

The volume information 316 is information indicating the following contents for each logical volume that is assigned to (i.e., accessible from) the server as the source of the search request.

Logical volume ID for identifying the logical volume concerned

Logical volume IQN assigned to the logical volume concerned

Information about each path usable for access from the server as the source of the search request to the logical volume concerned Here, the "information about each path" indicated in the third item of the above list is, more specifically, the following information.

IP address of the storage controller on each path

Information indicating whether each path is in an active state or a stand-by state (that is, information indicating whether the storage controller on the path is an active storage controller or a stand-by storage controller)

Specifically, upon receipt of the search request, the access request receiving unit 301a refers to the server management table 315. The search request includes the server ID of "SRV_3" of the server 150c as the source of the search request. Accordingly, the access request receiving unit 301a searches for an entry including the server ID of "SRV_3", and refers to the "logical volume ID" field of the entry found as a result of the search.

In the example of FIG. 15, the "logical volume ID" field includes only one ID of "VOL_5", but the "logical volume ID" field may include two or more IDs in some cases. The access request receiving unit 301a acquires, for each ID included in the "logical volume ID" field of the server management table 315, the logical volume IQN and information about each path usable for access to the logical volume identified by this ID.

For example, if the ID of "VOL_5" is found in the "logical volume ID" field of the server management table 315 as described above, the access request receiving unit 301a refers to the logical volume management table 314. Then, the access request receiving unit 301*a* searches the logical volume management table 314 for an entry having the ID of "VOL_5".

The access request receiving unit 301*a* reads, from the found entry, the logical volume IQN, the active storage controller number, and the stand-by storage controller number(s). According to the logical volume management table 314 in FIG. 14, "IQN-TGT55555" is obtained as the logical volume IQN. Further, "2" is obtained as the active storage controller number, and "1" and "3" are obtained as the stand-by storage controller numbers.

Moreover, the access request receiving unit 301*a* searches the storage controller management table 313 for an entry including the number of "2" obtained in such a manner as described above. Then, the access request receiving unit 301*a* reads the IP address from the found entry. Similarly, the access request receiving unit 301*a* also reads the IP addresses respectively corresponding to the numbers of "1" and "3", from the storage controller management table 313.

As a result of the processing as described above, the access request receiving unit 301*a* reaches the following recognition, and generates the volume information 316 in FIG. 15 from the recognized results.

The logical volume identified by the ID of "VOL_5" is assigned to the server 150*a* as the source of the search request, and the IQN of this logical volume is "IQN-TGT55555".

One of the paths for access to this logical volume is a path via the storage controller having the IP address of "10.20.40.50" (i.e., via the storage controller 120*a*), and this path is in a stand-by state. That is, the storage controller 120*a* is a stand-by storage controller.

Another one of the paths for access to this logical volume is a path via the storage controller having the IP address of "10.20.40.51" (i.e., via the storage controller 120*b*), and this path is in an active state. That is, the storage controller 120*b* is an active storage controller.

Still another one of the paths for access to this logical volume is a path via the storage controller having the IP address of "10.20.40.52" (i.e., via the storage controller 120*c*), and this path is in a stand-by state. That is, the storage controller 120*c* is a stand-by storage controller.

The access request receiving unit 301*a* transmits the generated volume information 316 to the server 150*c* via the network 140. Then, the server 150*c* (more specifically, the multi-path driver (not illustrated) in the server 150*c*) receives the volume information 316. The server 150*c* may output the received volume information 316 to an output device such as a display.

Subsequently, in Steps S315 to S317, the user inputs, for each path, a command (for example, the "iscsiadm" command) for a login process. More specifically, each command is input to the server 150*c* on the basis of the volume information 316. The server 150*c* performs the login process to the storage controller on each path, according to the inputted command.

Specifically, in Step S315, the user inputs, to the server 150*c*, the command in which at least the following two parameters are specified as arguments.

Logical volume IQN of "IQN-TGT55555"
IP address (that is, the IP address of "10.20.40.51") of the storage controller 120*b*, which is the active storage controller Accordingly, in Step S315, the server 150*c* performs the login process to the storage controller 120*b*.

Similarly, in Step S316, the user inputs, to the server 150*c*, the command in which at least the following two parameters are specified as arguments.

Logical volume IQN of "IQN-TGT55555"
IP address (that is, the IP address of "10.20.40.50") of the storage controller 120*a*, which is the stand-by storage controller Accordingly, in Step S316, the server 150*c* performs the login process to the storage controller 120*a*.

Similarly, in Step S317, the user inputs, to the server 150*c*, the command in which at least the following two parameters are specified as arguments.

Logical volume IQN of "IQN-TGT55555"
IP address (that is, the IP address of "10.20.40.52") of the storage controller 120*c*, which is the stand-by storage controller Accordingly, in Step S317, the server 150*c* performs the login process to the storage controller 120*c*. Note that the execution order of Steps S315 to S317 may be arbitrarily changed. As a result of the execution of Steps S315 to S317, the access from the multi-path driver of the server 150*c* to the logical volume identified by the ID of "VOL_5" is enabled.

Accordingly, after that, if an access request to the logical volume identified by the ID of "VOL_5" is issued on the server 150*c*, the access to this logical volume is executed via the multi-path driver of the server 150*c*. The access request may be issued in response to an input that is given by the user via an input device of the server 150*c*, or may be automatically issued in response to the execution of an application program by the server 150*c*. In any case, the access request issued in the application level on the server 150*c* is passed to the multi-path driver of the server 150*c*.

Then, the multi-path driver of the server 150*c* transmits an access request to the storage controller 120*b*, which is the active storage controller, via the network 140. In accordance with the access request, the storage controller 120*b* then accesses one or more of the logical units into which the logical volume identified by the ID of "VOL_5" is fragmented. Then, the storage controller 120*b* returns a reply to the server 150*c* on the basis of a result of the access to the logical unit (s). The operation of the storage controller 120*b* upon receipt of the access request is as illustrated in the flowchart of FIG. 11.

For example, in Step S318, the multi-path driver of the server 150*c* transmits, to the storage controller 120*b*, an access request to the logical volume identified by the ID of "VOL_5". This access request is received by the access request receiving unit 301*b* of the storage controller 120*b*, and is enqueued into the access request queue 302*b*.

For the sake of convenience of description, assume that the storage area to which access is requested by this access request is included in a logical unit in the storage 110*b*. Consequently, as illustrated in Step S319, the access command executing unit 303*b* of the storage controller 120*b* transmits an access command to the storage 110*b*. Then, the storage 110*b* accesses an appropriate physical storage device (that is, the storage device physically including the storage area to which access is requested) within the storage 110*b*.

After that, as illustrated in Step S320, the storage 110*b* returns a reply to the storage controller 120*b*. Consequently, the access command executing unit 303*b* of the storage controller 120*b* generates a reply to the server 150*c* on the basis of the reply from the storage 110*b*. Then, as illustrated in Step S321, the access request receiving unit 301*b* of the storage controller 120*b* returns the reply to the server 150*c*.

According to the first embodiment described above, when a new logical volume is added, an appropriate storage controller is selected in consideration of the difference in hardware performance among the storage controllers. Accordingly, the first embodiment enables load balancing that is based on the difference in hardware performance among the storage controllers, and thereby further equalizes the data access performance.

Next, the second embodiment is described with reference to FIGS. 16 to 19. The first embodiment and the second embodiment are different from each other in the operation sequence of a storage controller when the storage controller transmits two or more access commands to one or more storages in response to one access request from a server. The first embodiment and the second embodiment are the same as each other in the other features. Hereinafter, the second embodiment is described with the difference from the first embodiment being focused on.

FIGS. 16 and 17 are sequence diagrams for describing the internal processing time. Specifically, FIGS. 16 and 17 each illustrate an example of the following case.

The server 150a transmits an access request to a certain logical volume managed by the storage controller 120a.

The area accessed in response to this access request specifically spans a certain logical unit in the storage 110a and a certain logical unit in the storage 110b.

Accordingly, the storage controller 120a accesses both the storages 110a and 110b.

In the example of FIG. 16, first, as illustrated in Step S61, the server 150a transmits an access request to the storage controller 120a at a time T60. Then, the storage controller 120a receives the access request at a time T61.

After that, as illustrated in Step S62, the storage controller 120a transmits a first access command to the storage 110a at a time T62. Then, the storage 110a receives this access command at a time T63.

In the meantime, in the example of FIG. 9 of the first embodiment, the storage controller 120a transmits the access command to the storage 110b in Step S44 after the reception of the reply from the storage 110a in Step S43. In contrast, in the second embodiment, the storage controller 120a does not wait for the reception of a reply from the storage 110a. Specifically, as illustrated in Step S63, the storage controller 120a transmits a second access command to the storage 110b at a time T64. Then, the storage 110b receives this access command at a time T65.

Meanwhile, upon receipt of the access command at the time T63 as described above, the storage 110a accesses a physical storage device in accordance with the received access command. As a result, as illustrated in Step S64, the storage 110a returns a reply to the storage controller 120a at a time T66. The reply returned by the storage 110a is received by the storage controller 120a at a time T67.

In the example of FIG. 16, the storage controller 120a performs appropriate internal processing depending on the received reply. The internal processing is completed at a time T68.

Meanwhile, upon receipt of the access command at the time T65 as described above, the storage 110b accesses a physical storage device in accordance with the received access command. As a result, as illustrated in Step S65, the storage 110b returns a reply to the storage controller 120a at a time T69. The reply returned by the storage 110b is received by the storage controller 120a at a time T70.

Lastly, as illustrated in Step S66, the storage controller 120a returns a reply to the access request received in Step S61, to the server 150a at a time T71. Then, the server 150a receives the reply at a time T72.

In the example of FIG. 16 as described above, the internal processing time D of the storage controller 120a is, specifically, the sum of times D61, D62, D63, and D65 as indicated in Formula (6).

$$D = D61 + D62 + D63 + D65 \quad (6)$$
$$= (T62 - T61) + (T64 - T62) + (T68 - T67) + (T71 - T70)$$

Note that the internal processing time D does not include a waiting time D64 from the time T68 to the time T70. This is because the waiting time D64 does not depend on the hardware performance of the storage controller 120a. On the other hand, the times D61, D62, D63, and D65 depend on the hardware performance of the storage controller 120a. Hence, the internal processing time D in the example of FIG. 16 is defined as indicated in Formula (6).

For example, the internal processing time D61 includes: a length of time for which the access request transmitted by the server 150a in Step S61 is being queued in the access request queue 302a; and a length of time for which the access command executing unit 303a generates the access command to be transmitted in Step S62. Further, the internal processing time D62 includes a length of time for which the access command executing unit 303a generates the access command to be transmitted in Step S63. Meanwhile, the internal processing time D63 includes a length of time for which the access command executing unit 303a processes the reply received in Step S64. Further, the internal processing time D65 includes a length of time for which the access command executing unit 303a generates the single reply to be returned to the server 150a, from the two replies received in Steps S64 and S65.

Note that, in some cases, the storage controller 120a may receive the reply from the storage 110b before the storage controller 120a completes the internal processing at the time T68. In this case, the waiting time D64 is zero. Further, in this case, the reply from the storage 110b may be held in a reception buffer of the storage controller 120a until the time T68, and then may be processed after the internal processing concerning the reply from the storage 110a is completed at the time T68. Alternatively, the internal processing concerning the reply from the storage 110b may be executed in parallel with the internal processing concerning the reply from the storage 110a.

In any case, a waiting time from the time T64 to the time T67 is not included in the internal processing time D. Further, as described above, even in the case where the waiting time D64 exists, the waiting time D64 is not included in the internal processing time D.

In the meantime, in the example of FIG. 16, the storage 110a, to which the storage controller 120a first transmits the access command, returns the reply earlier than the storage 110b. In some cases, the reply from the storage 110b may be received by the storage controller 120a earlier than the reply from the storage 110a. FIG. 17 illustrates an example of such a case.

In the example of FIG. 17, first, as illustrated in Step S81, the server 150a transmits an access request to the storage controller 120a at a time T80. Then, the storage controller 120a receives the access request at a time T81.

After that, as illustrated in Step S82, the storage controller 120a transmits a first access command to the storage 110a at a time T82. Then, the storage 110a receives this access command at a time T83.

Further, as illustrated in Step S83, the storage controller 120a transmits a second access command to the storage 110b at a time T84. Then, the storage 110b receives this access command at a time T85.

Meanwhile, upon receipt of the access command at the time T83 as described above, the storage 110a accesses a physical storage device in accordance with the received access command. Similarly, upon receipt of the access command at the time T85, the storage 110b accesses a physical storage device in accordance with the received access command.

In the example of FIG. 17, the storage 110b completes the access to the physical storage device in a shorter time than that of the storage 110a. Hence, as illustrated in Step S84, the storage 110b returns a reply to the storage controller 120a at an early point in time, i.e., a time T86.

The reply returned by the storage 110b is received by the storage controller 120a at a time T87. Then, the storage controller 120a performs appropriate internal processing depending on the received reply. The internal processing is completed at a time T88.

Meanwhile, as illustrated in Step S85, the storage 110a, which has accessed the physical storage device as described above, returns a reply according to the access result, to the storage controller 120a only at a later point in time, i.e., a time T89. The reply returned by the storage 110a is received by the storage controller 120a at a time T90.

Lastly, as illustrated in Step S86, the storage controller 120a returns a reply to the access request received in Step S81, to the server 150a at a time T91. Then, the server 150a receives the reply at a time T92.

In the example of FIG. 17 as described above, the internal processing time D of the storage controller 120a is, specifically, the sum of times D81, D82, D83, and D85 as indicated in Formula (7).

$$D = D81 + D82 + D83 + D85 \quad (7)$$
$$= (T82 - T81) + (T84 - T82) + (T88 - T87) + (T91 - T90)$$

Note that the internal processing time D does not include a waiting time D84 from the time T88 to the time T90. This is because the waiting time D84 does not depend on the hardware performance of the storage controller 120a. On the other hand, the times D81, D82, D83, and D85 depend on the hardware performance of the storage controller 120a. Hence, the internal processing time D in the example of FIG. 17 is defined as indicated in Formula (7).

For example, the internal processing time D81 includes: a length of time for which the access request transmitted by the server 150a in Step S81 is being queued in the access request queue 302a; and a length of time for which the access command executing unit 303a generates the access command to be transmitted in Step S82. Further, the internal processing time D82 includes a length of time for which the access command executing unit 303a generates the access command to be transmitted in Step S83. Meanwhile, the internal processing time D83 includes a length of time for which the access command executing unit 303a processes the reply received in Step S84. Further, the internal processing time D85 includes a length of time for which the access command executing unit 303a generates the single reply to be returned to the server 150a, from the two replies received in Steps S84 and S85.

Note that, in some cases, the storage controller 120a may receive the reply from the storage 110a before the storage controller 120a completes the internal processing at the time T88. In this case, the waiting time D84 is zero. Further, in this case, the reply from the storage 110a may be held in the reception buffer of the storage controller 120a until the time T88, and then may be processed after the internal processing concerning the reply from the storage 110b is completed at the time T88. Alternatively, the internal processing concerning the reply from the storage 110a may be executed in parallel with the internal processing concerning the reply from the storage 110b.

In any case, a waiting time from the time T84 to the time T87 is not included in the internal processing time D. Further, as described above, even in the case where the waiting time D84 exists, the waiting time D84 is not included in the internal processing time D.

Next, the measurement of the internal processing time and the update of the time recording table in the second embodiment are specifically described with reference to FIGS. 18 and 19. FIGS. 18 and 19 are flowcharts of the processing that is performed by the storage controller of the second embodiment upon receipt of an access request.

The processing of FIGS. 18 and 19 is similar to the processing of FIG. 11, and hence the difference therefrom is mainly described below. Further, for the sake of convenience of description, the processing of FIGS. 18 and 19 is described by taking, as an example, the case where the storage controller 120a receives an access request from the server 150a.

Steps S401 to S405 are similar to Steps S101 to S105 in FIG. 11. In the second embodiment, even when internal processing in Step S405 is completed, the measurement of the internal processing time is not interrupted unlike Step S106 in FIG. 11.

Specifically, after the completion of the internal processing in Step S405, the access command executing unit 303a transmits an access command generated by the internal processing in Step S405, to a storage via the network 130 in Step S406. The transmission in Step S406 is similar to the transmission in Step S107 in FIG. 11.

In the second embodiment, the storage controller 120a does not wait for the reception of a reply to the access command transmitted in Step S405. Specifically, in Step S407 subsequent to Step S406, the control unit 304a judges whether or not there is still an access command to be transmitted to any storage. The judgment in Step S407 is similar to the judgment in Step S110 in FIG. 11.

If there is no more access command to be transmitted to any storage, the processing of FIGS. 18 and 19 proceeds to Step S408. Conversely, if there is still an access command to be transmitted to any storage, the processing of FIGS. 18 and 19 returns to Step S405.

For example, the example illustrated in FIGS. 6 and 7 is also applicable to the second embodiment. In the example illustrated in FIGS. 6 and 7, when Step S407 is first executed, the processing proceeds from Step S407 to Step S408. In comparison, in both of the example of FIG. 16 and the example of FIG. 17, the processing returns from Step S407 to Step S405.

For example, in the example of FIG. 16, Step S406 is executed at the time T62, and the processing then returns from Step S407 to Step S405. After that, Step S406 is executed again at the time T64, and the processing further proceeds from Step S407 to Step S408.

Similarly, in the example of FIG. 17, Step S406 is executed at the time T82, and the processing then returns from Step S407 to Step S405. Then, Step S406 is executed again at the time T84, and the processing further proceeds from Step S407 to Step S408.

In Step S408, the measurement of the internal processing time is once interrupted. Specifically, the control unit 304a updates the variable D in a manner similar to that in Step S106 in FIG. 11.

For example, in the example of FIG. 16, the variable T and the variable D are initialized in Step S401 at the time T61. Accordingly, the value of the variable D updated in Step S408 is (T64−T61)=(D61+D62). Similarly, in the example of FIG. 17, the value of the variable D updated in Step S408 is (T84−T81)=(D81+D82).

Then, as illustrated in Step S409, the access command executing unit 303a waits for the reception of a reply from any storage. If a reply is received from any storage (or if a reply that has already been received from any storage exists in the reception buffer), the control unit 304a restarts the measurement of the internal processing time in Step S410. That is, similarly to Step S109 in FIG. 11, the control unit 304a assigns the current time to the variable T.

Then, in Step S411, the access command executing unit 303a performs appropriate internal processing. For example, the access command executing unit 303a may prepare a reply to the server 150a on the basis of the reply from the storage.

After the internal processing in Step S411 is completed, in Step S412, the control unit 304a judges whether or not a reply has already been received for each of the one or more access commands having been transmitted by one or more repetitions of Steps S405 to S407. Then, if there is a reply that has not been received yet, the processing returns to Step S408. Conversely, if every reply has already been received, the processing proceeds to Step S413. Steps S413 to S416 are similar to Steps S111 to S114 in FIG. 11.

For example, in the example of FIG. 16, when the transmission of the access commands is completed at the time T64, the measurement of the internal processing time is once interrupted in Step S408. At this time, the value of the variable D is (D61+D62) as described above.

Then, upon receipt of the reply from the storage 110a at the time T67, the processing of FIGS. 18 and 19 proceeds from Step S409 to Step S410, and the measurement of the internal processing time is restarted in Step S410. After that, the internal processing in Step S411 is completed at the time T68.

Here, because the reply from the storage 110b has not been received yet, the processing of FIGS. 18 and 19 returns from Step S412 to Step S408, and the measurement of the internal processing time is once interrupted in Step S408. At this time, the value of the variable D is (D61+D62+D63).

After that, upon receipt of the reply from the storage 110b at the time T70, the processing of FIGS. 18 and 19 proceeds from Step S409 to Step S410, and the measurement of the internal processing time is restarted in Step S410. After that, the processing of FIGS. 18 and 19 proceeds from Step S411 to Step S412, and further proceeds from Step S412 to Step S413. Then, the internal processing in Step S413 is completed at the time T71.

Accordingly, in Step S414 (that is, at the time point at which the measurement of the internal processing time is completed), the value of the variable D is updated to (D61+D62+D63+D65). In Step S416, the internal processing time thus obtained (that is, the internal processing time D in Formula (6)) is written into the time recording table 306a.

Further, in the example of FIG. 17, when the transmission of the access commands is completed at the time T84, the measurement of the internal processing time is once interrupted in Step S408. At this time, the value of the variable D is (D81+D82) as described above.

Then, upon receipt of the reply from the storage 110b at the time T87, the processing of FIGS. 18 and 19 proceeds from Step S409 to Step S410, and the measurement of the internal processing time is restarted in Step S410. After that, the internal processing in Step S411 is completed at the time T88.

Here, because the reply from the storage 110a has not been received yet, the processing of FIGS. 18 and 19 returns from Step S412 to Step S408, and the measurement of the internal processing time is once interrupted in Step S408. At this time, the value of the variable D is (D81+D82+D83).

After that, upon receipt of the reply from the storage 110a at the time T90, the processing of FIGS. 18 and 19 proceeds from Step S409 to Step S410, and the measurement of the internal processing time is restarted in Step S410. After that, the processing of FIGS. 18 and 19 proceeds from Step S411 to Step S412, and further proceeds from Step S412 to Step S413. Then, the internal processing in Step S413 is completed at the time T91.

Accordingly, in Step S414 (that is, at the time point at which the measurement of the internal processing time is completed), the value of the variable D is updated to (D81+D82+D83+D85). In Step S416, the internal processing time thus obtained (that is, the internal processing time D in Formula (7)) is written into the time recording table 306a.

Also in the second embodiment, the two-stage aggregate calculation based on the data in the time recording table 306a is executed as illustrated in FIG. 12. Accordingly, the second embodiment also produces various effects similar to those of the first embodiment.

Note that the present invention is not limited to the first and second embodiments described above. Although some modifications are described in the above description, the above-described embodiments may be further modified from the following aspects, for example. The modifications described above and below may be arbitrarily combined with each other as long as no inconsistency arises.

FIGS. 10, 14, and 15 each illustrate the various pieces of data in the table format. Depending on embodiments, any data format other than the table format may be used. Further, description is mainly given of the case where the iSCSI protocol is used, but another protocol may be used, and appropriate data is used in accordance with the used protocol.

Further, in the first and second embodiments, the length of time from the completion of the reception of a certain message to the start of the transmission of another message in a storage controller is measured as the internal processing time of the storage controller. For example, in the example of FIG. 7, the length of time from the time T11b to the time T12a and the length of time from the time T15b to the time T16a are measured as the internal processing time. Depending on processing characteristics of the storage controller (for example, depending on whether or not the storage controller performs internal processing in parallel with the transmission and/or reception of a message(s)), the definition of the internal processing time may be different from that of FIG. 7.

Further, FIGS. 11, 18, and 19 illustrate the measurement procedures using the variables T and D, as the specific examples of the measurement of the internal processing time performed by the storage controller. Depending on embodiments, the internal processing time may be measured according to another method (for example, a method of using the hardware timer included in the CPU 211 in the storage controller 120). For example, the control unit 304a of the storage controller 120a may measure the internal processing time by giving the timer some instructions such as "measurement start", "measurement interruption", and "measurement end".

Depending on embodiments, time information other than the average internal processing times stored in the secondary aggregate table 312 in FIG. 10 may be used in Step S2 in FIG.

1. For example, a new logical volume may be desired to be created for a service in which the load is expected to be concentrated in a particular period of time (for example, from 13:00 to 15:00 on Mondays). In such a case, instead of the average internal processing time throughout the latest one week, the average internal processing time in the particular period of time included in the latest one week may be calculated, and the value thus calculated may be used as the time information in Step S2.

Note that the length of period of "one week" in the above-mentioned "average internal processing time in the particular period of time included in the latest one week" is given as a mere example, and the length of period may be arbitrarily determined. For example, the average internal processing time in the particular period of time included in the latest one month may be calculated and used as the time information.

Depending on embodiments, Step S204 in FIG. 12 may be omitted. Instead, when the selection unit 309 selects an active storage controller for a new logical volume as illustrated in Step S2 in FIG. 1, the selection unit 309 may calculate the average internal processing time according to Formula (4) from each primary aggregate table in the primary aggregate tables 311. Then, the selection unit 309 may write the average internal processing time calculated for each storage controller, into the secondary aggregate table 312. Consequently, the selection unit 309 is enabled to execute the selection in Step S2 on the basis of the secondary aggregate table 312 thus updated.

That is, as illustrated in Step S204, each storage controller may update the time information (for example, the average internal processing time per access request in the latest one week) concerning the storage controller itself. Alternatively, each storage controller may simply store another piece of information for calculation of the time information, into a storage device (e.g., the shared disk 170) accessible from the selection unit 309.

FIG. 10 illustrates the primary aggregate tables 311, as specific examples of "another piece of information for calculation of the time information". More specifically, the piece of information that is written, for calculation of the time information, by each storage controller into the shared disk 170 may be each average internal processing time in the primary aggregate table corresponding to the storage controller itself.

For example, as illustrated in FIG. 10, the average internal processing time per access request in each one-minute period within the latest one week may be written, for calculation of the time information, by each storage controller into the shared disk 170. Then, aggregate calculation from the primary aggregate tables 311 to the secondary aggregate table 312 may be executed by the selection unit 309.

That is, the selection unit 309 may read the time information that is calculated in advance by each storage controller, to thereby acquire the time information, or may calculate the time information by itself, to thereby acquire the time information.

Further, in the case where not the control unit of each storage controller but the selection unit 309 updates the secondary aggregate table 312 as described above, the secondary aggregate table 312 may be stored in a storage device other than the shared disk 170. For example, the secondary aggregate table 312 may be stored in the RAM 212 of the storage controller including the management unit 307. That is, the time storage unit that stores the time information therein may be realized by the RAM 212.

In the meantime, in order to realize the access request receiving unit 301a, the access command executing unit 303a, and the control unit 304a, any of a general-purpose processor such as the CPU 211 in FIG. 4, a dedicated hardware circuit such as an ASIC, and the combination thereof may be used. Similarly, in order to realize the management unit 307 including the creation request receiving unit 308 and the selection unit 309, any of a general-purpose processor such as the CPU 211, a dedicated hardware circuit such as an ASIC, and the combination thereof may be used.

In the case where a general-purpose processor such as the CPU 211 is used, a program executed by the processor may be stored in advance in a non-volatile storage device (for example, the non-volatile storage device 213 in FIG. 4). The program may be downloaded from a network (for example, the network 140), and may be installed into a device (for example, the storage controller 120a) including the processor.

Depending on embodiments, the program executed by the processor may be provided while being stored in a computer-readable portable storage medium. Examples of the portable storage medium that are available include an optical disk such as a compact disc (CD) and a digital versatile disk (DVD), a magneto-optical disk, a magnetic disk, and a semiconductor memory card. Note that these portable storage media and, for example, the RAM 212 and the non-volatile storage device 213 in FIG. 4 are all a type of tangible storage medium (i.e., tangible recording medium), and are not a transitory medium such as signal carriers.

In the meantime, in the example of FIG. 5, the management unit 307 is included in a particular one (that is, the storage controller 120a) of the plurality of storage controllers in the virtual storage system 100. Accordingly, in the example of FIG. 5, the storage controller selecting system including the shared disk 170 as the time storage unit and the management unit 307 shares part of the hardware with the virtual storage system 100. Alternatively, the management unit 307 may be included in a device different from all the storage controllers.

For example, a management controller including the management unit 307 may be provided independently of the plurality of storage controllers. The management controller is connected to both the networks 130 and 140. The hardware configuration of the management controller may be, for example, similar to that of the storage controller 120 in FIG. 4.

Note that an embodiment in which a certain storage controller includes the management unit 307 as in the first and second embodiments is excellent in costs as well as fault tolerance, compared with an embodiment using such an independent management controller. The reason for this is as follows.

In the embodiment using the management controller dedicated to the management unit 307 in addition to the plurality of storage controllers, the user needs the cost for purchasing the management controller. In contrast, in the case where the management unit 307 is included in the storage controller 120a as illustrated in FIG. 5, the cost for the management controller is not necessary.

Further, in the embodiment using the management controller, if the number of management controllers is only one, the management controller is a single point of failure (SPoF). That is, while the one management controller is down due to a failure, it is unable to create a new logical volume. A redundant configuration using two or more management controllers may be adopted, but such a redundant configuration involves higher costs.

In the meantime, the management unit 307 can be realized by the CPU 211 that executes a program, the communication interface 214, and the communication interface 215. In addition, the CPU 211, the communication interface 214, and the communication interface 215 are components that are also included in the storage controllers not including the management unit 307. That is, it is not necessary to add a new hardware component to a storage controller in order only to enable the storage controller to fulfill a function as the management unit 307. Hence, the first and second embodiments are more excellent in costs than the embodiment using the independent management controller.

In addition, in the first and second embodiments, it is easy to improve fault tolerance according to the following mechanism. Accordingly, the first and second embodiments are excellent also in fault tolerance.

It is assumed that a program for the management unit 307 is installed in advance in two or more storage controllers (for example, all the storage controllers in the virtual storage system 100). It is also assumed that the program for the management unit 307 is enabled in only a particular one (in the example of FIG. 5, the storage controller 120a) of the two or more storage controllers. In this configuration, the particular one storage controller operates also as the management unit 307.

Meanwhile, it is also assumed that the program for the management unit 307 is disabled in the other storage controller(s). For example, in the example of FIG. 5, the program for the management unit 307 is disabled in the storage controller 120b. Accordingly, the storage controller 120b does not operate as the management unit 307. Hence, in FIG. 5, the management unit 307 is not illustrated in the block of the storage controller 120b.

In the case where the particular one storage controller breaks down (i.e., a failure occurs in the particular one storage controller), not only failover concerning a logical volume(s) but also failover concerning the management unit 307 is performed. For example, if the storage controller 120a breaks down, the installed program for the management unit 307 may be enabled in the storage controller 120b in response to the detection of the breakdown. As a result, the storage controller 120b starts to operate also as the management unit 307 thereafter. As a matter of course, in some cases, a storage controller other than the storage controller 120b may start to newly operate also as the management unit 307.

The failover concerning the management unit 307 may be performed, for example, in such a manner as described above. Then, if the failover concerning the management unit 307 is possible, this means that the fault tolerance concerning the management unit 307 is excellent. Accordingly, the first and second embodiments are more excellent in not only costs but also fault tolerance than the embodiment using the independent management controller.

According to the storage controller selecting system of each of the above-mentioned various embodiments, it is possible to achieve proper selection of a storage controller for managing a new logical volume such that preferable data access performance can be obtained.

All examples and conditional language provided herein are intended for the pedagogical purposes of aiding the reader in understanding the invention and the concepts contributed by the inventor to further the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage controller selecting system comprising:
  a time information storage unit configured to store internal processing time information for each of a plurality of storage controllers, the internal processing time information for each individual storage controller relating to an internal processing time taken for processing performed within the individual storage controller in response to an access request to a logical volume;
  a receiver configured to receive a creation request for requesting creation of a new logical volume; and
  a processor configured to select a certain storage controller from among the plurality of storage controllers according to the internal processing time information, and to cause the certain storage controller to create the new logical volume.

2. The storage controller selecting system according to claim 1, wherein
  the receiver and the processor are included in one of the plurality of storage controllers, and
  each individual storage controller of the plurality of storage controllers is configured to
    measure each internal processing time that is taken for processing performed within the individual storage controller in response to each of a plurality of access requests received by the individual storage controller, and
    update the internal processing time information for the individual storage controller according to the measured internal processing time, or store another piece of information for calculation of the internal processing time information into a storage device accessible from the processor.

3. The storage controller selecting system according to claim 2, wherein the time information storage unit is connected to the plurality of storage controllers via a network.

4. The storage controller selecting system according to claim 1, wherein the internal processing time information is a statistic that is calculated from the internal processing times corresponding to a plurality of access requests having been issued within a certain past period of time.

5. The storage controller selecting system according to claim 1, wherein the certain storage controller is a storage controller whose internal processing time information indicates the shortest time among the plurality of storage controllers.

6. The storage controller selecting system according to claim 1, wherein
  in response to the access request, each storage controller accesses at least one of logical units into which the logical volume to which the access request is directed is fragmented, and
  the internal processing time does not include a time of waiting for reception of a result of access to the at least one of the logical units.

7. The storage controller selecting system according to claim 6, wherein the internal processing time includes a length of time for which the access request is being queued.

8. The storage controller selecting system according to claim 1, wherein the internal processing time is part of a period of time from a point in time when reception of the access request is completed to a point in time when transmission of a response to the access request is started.

9. The storage controller selecting system according to claim 1, wherein
  the processor further selects a stand-by storage controller from among the plurality of storage controllers, and the stand-by storage controller is to manage the new logical volume in place of the certain storage controller in response to a failure in the certain storage controller.

10. The storage controller selecting system according to claim 9, wherein the processor selects the stand-by storage controller according to the internal processing time information.

11. The storage controller selecting system according to claim 1, wherein
each logical volume is fragmented into two or more logical units, and
each logical unit is realized by one or more physical storage devices.

12. The storage controller selecting system according to claim 1, wherein
in creating the new logical volume, the certain storage controller fragments the new logical volume into two or more logical units realized by different physical storage devices.

13. A storage controller selecting method comprising:
receiving, by a computer, a creation request for requesting creation of a new logical volume;
acquiring, by the computer, internal processing time information for each of a plurality of storage controllers, the internal processing time information for each individual storage controller relating to an internal processing time taken for processing performed within the individual storage controller in response to an access request to a logical volume;
selecting, by the computer, a certain storage controller from among the plurality of storage controllers according to the internal processing time information; and
causing, by the computer, the certain storage controller to create the new logical volume.

14. A non-transitory computer-readable recording medium having stored therein a program for causing a computer to execute a process comprising:
receiving a creation request for requesting creation of a new logical volume;
acquiring internal processing time information for each of a plurality of storage controllers, the internal processing time information for each individual storage controller relating to an internal processing time taken for processing performed within the individual storage controller in response to an access request to a logical volume;
selecting a certain storage controller from among the plurality of storage controllers according to the internal processing time information; and
causing the certain storage controller to create the new logical volume.

15. The non-transitory recording medium according to claim 14, wherein the computer is included in one of the plurality of storage controllers.

* * * * *